(12) United States Patent
Karppi et al.

(10) Patent No.: US 8,304,533 B2
(45) Date of Patent: Nov. 6, 2012

(54) CATIONIC POLYSACCHARIDE, ITS PREPARATION AND USE

(75) Inventors: Asko Karppi, Turku (FI); Bengt-Erik Knubb, Turku (FI); Holger Reinicke, Lörrach (DE)

(73) Assignee: BASF SE Ludwigshafen (DE)

( * ) Notice: Subject to any disclaimer, the term of this patent is extended or adjusted under 35 U.S.C. 154(b) by 335 days.

(21) Appl. No.: 12/226,557

(22) PCT Filed: Apr. 24, 2007

(86) PCT No.: PCT/EP2007/003562
§ 371 (c)(1),
(2), (4) Date: May 20, 2010

(87) PCT Pub. No.: WO2007/121981
PCT Pub. Date: Nov. 1, 2007

(65) Prior Publication Data
US 2010/0282425 A1 Nov. 11, 2010

(30) Foreign Application Priority Data
Apr. 24, 2006 (EP) .................................... 06008386

(51) Int. Cl.
*C08B 31/00* (2006.01)
(52) U.S. Cl. ....................................... 536/102; 162/175
(58) Field of Classification Search .................. 536/102, 536/105, 50, 108, 111; 162/175
See application file for complete search history.

(56) References Cited

U.S. PATENT DOCUMENTS

| | | | |
|---|---|---|---|
| 3,464,974 A * | 9/1969 | Le Roy et al. .................. 536/50 |
| 4,785,087 A | 11/1988 | Stober et al. .................. 536/111 |
| 5,074,961 A | 12/1991 | Dreisbach et al. | |
| 5,474,655 A | 12/1995 | Schulte et al. | |
| 5,556,510 A | 9/1996 | Dreisbach et al. | |
| 2001/0014736 A1 | 8/2001 | Likitalo et al. .................. 536/102 |
| 2004/0112559 A1 | 6/2004 | Du Bourg et al. | |
| 2006/0225855 A1 | 10/2006 | Ladret et al. .................. 162/175 |

FOREIGN PATENT DOCUMENTS

| | | |
|---|---|---|
| CN | 1303395 A | 7/2001 |
| EP | 0 353 212 A1 | 1/1990 |
| EP | 1 039 026 A1 | 9/2000 |
| FR | 2 854 898 | 11/2004 |
| GB | 2 063 282 A | 6/1981 |
| WO | WO 9518157 A1 | 7/1995 |
| WO | 99/62957 | 12/1999 |
| WO | WO 99/64677 | 12/1999 |
| WO | WO 2006/003122 A1 | 1/2006 |

OTHER PUBLICATIONS

Examination Report in related European Patent Application No. 09 015 072.3 dated Apr. 27, 2010.
C.W. Vaughan et al., Zweikomponenten-Hilfsmittel für Entwässerung/Retention/Blattbildung verbessert Produktivität und Runnability der Papiermaschine, Wochenblatt für Papierfabrikation (Oct. 1988), pp. 458-471.
O.B. Wurzburg, Modified Starches: Properties and Uses (1986), pp. 113-124.
Hellwig et al., Production of Cationic Starch Ethers Using an Improved Dry Process, Starch/Stärke 44 (1992), pp. 69-74.
Haack et al., Macromol. Mater. Eng. (2002), pp. 495-502.
Office Action in related Chinese Patent Application No. 200780014829.5 dated Dec. 1, 2010.

* cited by examiner

*Primary Examiner* — Mark Halpern
(74) *Attorney, Agent, or Firm* — Drinker, Biddle & Reath

(57) ABSTRACT

The present invention relates to polysaccharide, preferably starch, of high purity having cationic degree of substitution over 0.50 and bound nitrogen index after cationization reaction stage over 0.75, and to preparation thereof as well as to its use in making of paper or paperboard.

8 Claims, 19 Drawing Sheets

Paper machine headbox with approach piping system

CATIONIC POLYSACCHARIDE, ITS PREPARATION AND USE

CROSS REFERENCE TO RELATED APPLICATIONS

This application is a §371 National Stage Application of PCT International Applicaton No. PCT/EP2007/003562, filed on Apr. 24, 2007, which claims priority under 35 U.S.C. §119 and/or §365 to European Application No. 06008386.2 filed Apr. 24, 2006.

The present invention relates to cationic polysaccharide, preferably starch, and to preparation thereof as well as to its use in papermaking.

BACKGROUND

Cationic starches and other cationic polysaccharides are widely used and useful additives in paper industry. Fiber, filler and fines material in the paper making have typically negative (anionic) net surface charge. The affinity of polysaccharide to negatively charged material will improve if the polysaccharide contains positive charges in the polymer backbone. Cationic polysaccharides will adsorp stronger onto fiber, filler and fines material of the stock than noncationic polymer. Stronger adsorption can be achieved due to electrostatic attraction forces of negative and positive charges in aqueous solution. Conventional cationic polysaccharides, e.g. cationic starches, which have typically rather low substitution level (DS below 0.06) and are produced as dry powder form, are widely used as dry strength agents in the wet end applications, as surface sizes and in some cases even as coating binders.

Many operations in papermaking will increase the amount of anionic material of the stock. Such are for example closing of the water circulation systems, which will increase the concentration of anionic material. Also hydrogen peroxide bleaching liberates anionic compounds from hemicellulose in to the stock. Plenty of anionic material comes from mechanical pulp (pitch compounds) and from re-pulped coated paper (white pitch). Within such stocks very high cationic starches can be used as ATC-agents (anionic-trash-collectors) and as anti-dusting-agents. In such cases the DS levels are from 0.1 to even up to 1.0. In such cases the performance of cationic starches is more like a performance of cationic polymer rather than the performance of starch. Also the increasing prices of oil based polymers make the natural polymers more attractive.

It is standard practise to manufacture paper by a process that comprises flocculating a cellulosic thin stock by the addition of polymeric retention aid and then draining the flocculated suspension through a moving screen (often referred to as machine wire) to form a wet sheet, which is then dried. Some polymers tend to generate rather coarse flocs and although retention and drainage may be good, unfortunately the formation and the rate of drying may be impaired. The concept of formation is an indication of the arrangement of fibres and fillers within the sheet. A very uniform arrangement is referred to as good formation and is generally associated with better printability, opacity and stability of the paper but also with slow drainage [e.g. Vaughan, Adamsky F. A., Richardson P. F., Zweikomponenten-Hilfsmittel für Entwässerung/Retention/Blattbildung verbessert Produktivität and Runnability der Papiermaschine, Wochenblatt für Papierfabrikation Ser. No. 10/1998, 458-471]. In contrast, an uneven distribution of fibres and fillers is usually regarded as poor formation, but it tends to be associated with rapid drainage. It is often difficult to obtain the optimum balance between retention, drainage and formation by adding a single polymeric retention aid and it is therefore common practise to add two separate materials in sequence, such as a high molecular weight flocculant followed by siliceous material. However, this approach causes an increased complexity of the retention and drainage system, and thus it is often desirable to achieve an optimum balance between retention, drainage and formation with a single polymeric retention aid or even to further improve this balance within dual or multi component retention and drainage systems.

Furthermore producers of paper in contact with food are always looking for retention and drainage aids with less toxic cationic monomer and less residual monomer thereof in the additive. In consideration of continuously increasing scarcity of oil it would also be desirable to use natural polymers in this regard.

There exist many different botanical polysaccharides, which are commercially used in paper making and which thus have commercial importance. Such are for example starch from potato, tapioca, wheat, corn, waxy-corn and oats, natural galacto-glucomannans of wood material, guar gum etc. Practically all of the polysaccharides can be cationised using the same or similar technique. Even though starch is used as a reference here, also other polysaccharides can thus be used as well.

The basic chemistry of starch cationisation as well as cationisation of other polysaccharides is well known in literature. The topic is clarified in many books and articles e.g. O. B. Wurzburg: Modified Starches: Properties and Uses (1986), pages 113-124. Even though literature and patent publications knows several compounds that can be used as a cationising agent for polysaccharide, there exists practically two compounds, which have commercial importance. One is 2,3-epoxypropyltrimethylammonium chloride (EPTAC) and the other is 3-chloro-2-hydroxypropyltrimethylammonium chloride (CHPTAC). Both of the chemicals are commercially available in concentrated aqueous solutions. The products have typically purity around 92-97% calculated from the nonaqueous material. There exist some inactive secondary products in the commercial products such as bis-(trimethylammonium chloride)-2-hydroxypropane (BISQUAT) and 2,3-dihydroxypropyltrimethylammonium chloride (DHPTAC). BISQUAT is secondary reaction compound of the forming reaction of the both active compound. DHPTAC is the hydrolysis compound of EPTAC. EPTAC is not totally stable in aqueous solution, but hydrolyses slowly to DHPTAC. There exist differences in both compositions and total quantity of secondary compounds within different commercial cationising agents. Commercial EPTAC products are for example Raisacat 151 and Quab 151. Commercial CHPTAC products are for example Raisacat 188, Quab 188 and Quat 188.

With the above mentioned commercial cationising chemicals, the cationisation reaction is exactly the chemical reaction between starch alcoxide ion and the epoxide ring of EPTAC and the reaction will yield to formation of starch ether. Cationic group of EPTAC will thus be covalently bonded into starch backbone. The reaction is catalysed by base. Base is needed to generate the starch alcoxide-ion. Typical catalyst is sodium hydroxide, but other bases like potassium hydroxide, lithium hydroxide or calcium hydroxide can be used as well. Typical catalyst concentrations are around 0.5-4.0 w-% calculated of the quantity of dry (100%) starch. In the use of CHPTAC as a cationising agent, EPTAC is still the compound, which finally reacts with starch. CHPTAC must be converted first to EPTAC before the cationisation reaction can start. That can be done by adding extra equivalent of base, typically sodium hydroxide, which reacts with CHPTAC and converts it to EPTAC via ring closure reaction of the chlorohydrin group of CHPTAC. Equivalent of chloride salt of the base will be liberate at the same time. The conversion typically takes place "in situ" in the reaction mixture. When EPTAC is formed, the cationisation reaction goes in the same manner as when EPTAC is used as a cationising agent. This means that CHPTAC requires an extra equivalent of base for the conversion to EPTAC, but also a catalytic quantity to generate the required starch alcoxide. Also an extra equivalent of chloride salt of the base will remain in the reaction mixture.

Polysaccharides are not exact compounds but polymeric material which have distribution in molecular weight. In order to define substitution level of cationised products the term degree of substitution (DS) is commonly used. DS is the result of substituted saccharide units divided by total saccharide units. Saccharide units have variable quantities of hydroxyl groups into which cationising agents can react. For example anhydroglucose (AHG) units of starch amylose have 3 hydroxyl groups and thus the theoretical maximum DS is 3.0. Practical maximum is lower because steric hindrance of the substituents. Cationic starch of DS 1.0 has 1 cationic group in every AHG unit in average. Cationic starch of DS 0.1 has thus 1 cationic substituent in every $10^{th}$ AHG unit in average.

Substitution level of cationic starch can be calculated in many ways. The most typical way is to calculate it form the nitrogen content of pure dry cationic starch. In such case the DS can be calculated with the following equation:

$$DS = N\text{-}\% \times 162/(1400 - N\text{-}\% \times 151.6)$$

N-content can be determined e.g. by commonly known Kjeldahl-method. The value 162 in the equation is molecular weight of starch AHG. If other polysaccharide than starch is used then the average molecular weight of the saccharide units must be used. The value 151.6 is the molecular weight of EPTAC. Thus for example cationic starch with nitrogen content of 3.5% has DS 0.65.

The term molar ratio (MR) is used to define the molar quantity of cationising agent compared to molar quantity of saccharide unit of the polysaccharide in the cationisation reaction mixture. For example MR 0.1 means that the reaction mixture contains 1 cationising agent molecule for each 10 saccharide units of the polysaccharide. The yield of the cationisation reaction can be calculated thus with the following equation:

$$\text{Yield} = (DS/MR) \times 100\%$$

In the cationisation reaction the EPTAC remnant will be covalently bonded into starch and can't be removed e.g. by washing. On the other hand if EPTAC hasn't reacted with starch but is e.g. hydrolysed, it is not covalently bonded into starch and can be washed away. In order to define the cationic purity of cationic starch product, a bound nitrogen index (BNI) can be used. The BNI value can be calculated from bound nitrogen content of cationic starch and total nitrogen content of cationic starch. The bound nitrogen content is the nitrogen content of pure cationic starch, in which nitrogen is covalently bonded into starch. The total nitrogen content is the nitrogen content of cationic starch product, calculated from dry solids material, which contains also the unbound quaternary ammonium compound i.e. secondary products of the cationising agent including possible unreacted cationising agent. BNI value can be calculated from the following equation:

$$BNI = (N\text{-}\%_{Bound} \times 162/(1400 - N\text{-}\%_{Bound} \times 151.6))/(N\text{-}\%_{Total} \times 162/(1400 - N\text{-}\%_{Total} \times 151.6)),$$

i.e.

$$BNI = DS/MR_{N\text{-}Total}$$

The term $MR_{N\text{-}Total}$ is post-calculated "molar ratio", calculated from the total nitrogen content of dry un-washed product.

If all of the nitrogen is bound, the BNI value is 1, if none of the nitrogen is bound the BNI value is 0, other wise the BNI value is between 0 and 1. If the reaction yield is 75%, the BNI value is 0.75 if the purity of the cationising agent has been 100%. As the purities of the commercial cationising agents are lower than 100%, the BNI value with 75% yield is lower than 0.75. It must be observed that the BNI value differs from the cationisation yield value in a way that the secondary compounds, which exist in the cationising agent before the start of the cationisation reaction, also impact on the BNI value. In addition, the spirit of BNI value is that other nitrogen containing compounds than those originating form cationising agent, which impact on total nitrogen content value, are not counted. Such compounds are e.g. urea which can be used in starch solutions as viscosity control agent.

There are many commonly known processes for cationisation of starch, which are also described in the already mentioned book by O. B. Wurzburg. Such are for example slurry process (wet process), dry cationisation process and gel cationisation process. In the slurry process starch is in slurry form, which have dry solids content up to 44%, into which cationising reagent is dosed and pH is kept alkaline, typically between 10.5-12 at 35-45° C. Starch will remain in granular form during the whole reaction. When cationisation reaction is complete, the reaction mixture is typically neutralised, after which starch slurry is filtered, optionally washed and then dried to the target dry substance content level. Final product is thus starch powder. However, there are some weaknesses with the process. Maximum degree of substitution (DS) is about 0.06. Above that DS level, starch granules start to swell and even partly gelatinise due to adequate cationicity and such starch slurry is difficult to filter and thus powder like products are not possible to produce. Also DS level of 0.06 is low for the market needs at present. In addition cationisation yield of the process, which is around 85% in the maximum, is not sufficient.

The main reason for inadequate reaction yield with slurry process is due to hydrolysis of EPTAC to DHPTAC because of plenty of water present in the reaction mixture. In order to avoid the hydrolysis of EPTAC and achieve better process yield, water content in the reaction mixture has been decreased. That can be done technically with the dry process. There exists several articles and patents about the dry process. For example an article by Hellwig et al. (Production of Cationic Starch Ethers Using an Improved Dry Process, Starch/Stärke 44 (1992) 69-74) describes the improved dry cationising method, i.e. so called Powdercat Process. It is distinguished by short reaction time in the reactor, which is in the case rather a mixer. The reaction mixture is agitated for up to 30 min, after which the reaction mixture is transferred to a storage bin for complete reaction. Reaction yields up to 95% have been reached with potato, tapioca and corn starch. Also DHPTAC concentration with the dry process is much lower compared to concentration with slurry process. The maximum DS level which can be produced with dry process in one reaction step is 0.5. It is said that even higher DS level can be attained but that it requires several consecutive reaction steps. This means that already cationised starch is used as a raw material which is then cationised further. Also production in aqueous medium leads to considerable problems e.g. with the isolation of the cationic starch. This is very complicated in production point of view.

Also patent publication GB-A-2063282 describes the dry cationisation process. Starch is dosed into suitable reactor e.g. Lödige-type reactor, in dry powder form, cationising agent, e.g. EPTAC or CHPTAC is introduced into starch powder after which catalyst is also introduced. Reaction mixture is heated up 20-90° C., optimally 60-80° C. and cationisation reaction takes place. The product will remain in dry powder form during the cationisation reaction. When reaction is completed, the product is neutralised. Process yields of about 100% have been mentioned. The maximum DS level of 0.47 (N-content 2.8%) was achieved.

Patent publication U.S. Pat. No. 4,785,087 describes dry process in which finely divided silica is used in the activator mixture. Good yields have been achieved, but the maximum DS with the process is only 0.3.

An issue which impacts on the processing of cationic starch mixtures of DS above 0.5, is the dissolving or pasting of the starch granules, due to which dry process is not applicable. However there exist processes to produce cationic starches of DS above 0.5. Patent publication WO-A1-9518157 describes the so called gel-cationising process for production of high cationic starches. The method describes cationisation of starch in which solids content of the reaction mixture is over 50%. Reaction mixture is heated to 60° C. and the reaction mixture turns to gel like matrix. Cationic starch of DS 0.75 has been made with 75% yield. However the method requires degrading/splitting/thinning (i.e. lowering of the molecular weight of starch) of starch which is obviously needed to lower the viscosity of the reaction mixture after gelatinisation of starch. Even though the cationisation reaction yield of the process can be considered moderately good, there is a need for better cationisation yield to achieve cationic starches of higher purity.

Patent publication WO-A1-9962957 describes the method for production of high cationic starches with DS of 0.1-1.0 with a method, which contains at least two reaction steps. The method consists of a cold preliminary reaction at 5-40° C., after which there is a rapid elevation of temperature to 70-180° C. and finally a post reaction at temperature lower than 100° C. The reaction yields with the method are mentioned to be between 75-95%. Generally the yield is better with lower DS values and it is mentioned that yield is over 90% with DS values less than 0.4. A cationic starch of DS 0.7 has been produced (experiment 4). MR of the reaction mixture was 0.9 and N-content of the polymer 3.6% (DS 0.7). The reaction yield was thus 75%, which is at the same level than presented in the method described in the patent publication WO-A1-9518157. However there is need for high cationic starches with DS over 0.5 and which have higher purity.

It must be noticed that in the experiment exists a typing error concerning the used raw materials. Experiments lack the concentration of starch and cationizing agent. For example in the experiment 4 MR is said to be 0.9. If starch and EPTAC concentrations would be both 100%, MR would then be 1.0, which is not correct. It is thus obvious that starch is potato starch with moisture content of 18% (equilibrium moisture content). Cationizing agent is clearly commercial EPTAC product with typical concentration of 72%. With these concetrations MR is 0.9 in the experiment 4 and MR's of the other experiments match also very well. It must be observed that the wrong concentrations impact also to the total-water-amounts of examples.

An article of Haack et al. (Macromol. Mater. Eng. 2002, page 495-502) describes the production of highly cationic starches up to DS 1.05. In the process dried starch is suspended in diluted sodium hydroxide and heated to 60° C. EPTAC reagent is added by drops. The reaction time is 6 hours at 60° C. and during the reaction the mixture is diluted with water. Reaction yields with the process are rather poor, varying 23-76%. The lowest reaction yields have been achieved with the highest MR values. The reaction yield with the process is not satisfactory in order to produce high cationic starches with high purity.

It can be summarised that with the known cationisation technology it is not possible to manufacture cationic starches, which have DS above 0.5 and which have adequate purity, in a way which is efficient and has commercial interest.

DESCRIPTION OF THE INVENTION

Figure 1A:
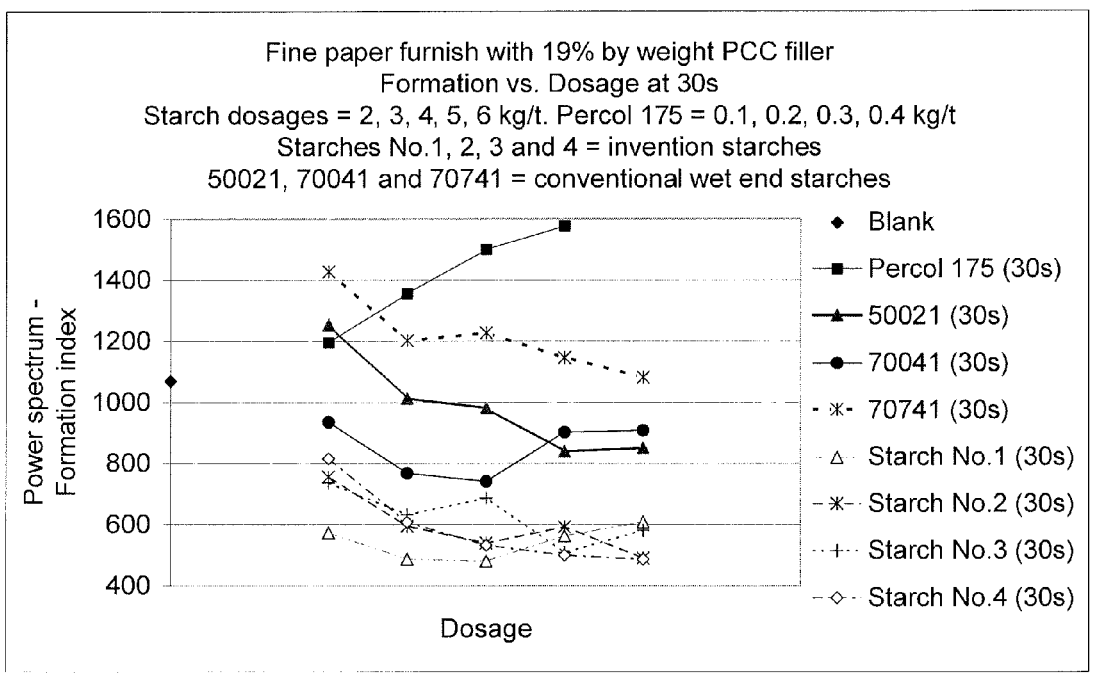
FIG. 1A depicts the application window of different polymeric retention aids in terms of formation vs. dosage. The Figure shows the formation as response to chemical dosage at 30 seconds running time of experiment.

The invention is characterised in that the polysaccharide, preferably starch, has cationic degree of substitution (DS) over 0.50 and bound nitrogen index (BNI) after cationisation reaction stage over 0.75.

A second aspect of the invention is the use low shear mixer, especially conical screw mixer, as reaction vessel in the cationization of polysaccharides, preferably starch.

A third aspect of the invention is the use of polysaccharide, preferably starch, with DS over 0.50 and BNI after cationisation reaction stage over 0.75, as additive in making paper or paperboard, preferably as retention and drainage aid.

A fourth aspect of the invention is the use of polysaccharide, preferably starch, with DS over 0.2 to 1.0, preferably from 0.3 to 0.9, and molecular weight average ($MW_{Average}$) over 30 000 000 Dalton, preferably over 40 000 000 Dalton, most preferably starch with starch backbone not degraded or cross-linked, as additive in making paper or paperboard, preferably as fixative (i.e. as deposit control agent).

The resulting paper or paperboard which has been manufactured with the disclosed cationic polysaccharide constitutes fifth aspect of the invention.

A sixth aspect of the invention is cationic polysaccharide powder, preferably cationic starch powder, with at least 80% dry solids, with DS from over 0.2 to 1.0, preferably from 0.3 to 0.9, and with particle size number average from 75 μm to 1500 μm, preferably from 75 μm to 1000 μm.

It has been observed that cationic polysaccharides with DS above 0.50, even above 0.55 or 0.60, can be successfully produced with good reaction yield in one reaction step. It has been observed that if water content in the reaction mixture, temperature and catalyst quantity are in right balance, the reaction yield will be good also with high DS levels. BNI of the polysaccharide will then be at least 0.75 or even 0.80.

The invention is applicable to almost any known polysaccharide. Suitable examples are starch, e.g. from potato, tapioca, wheat, corn, waxy-corn and oats, natural galacto-glucomannans of wood material and guar gum or mixtures thereof. The polysaccharide may be unmodified or modified. Preferably the polysaccharide is starch.

One of the key aspects of the invention is that the polysaccharide, preferably starch, needs not necessarily be degraded before the cationisation reaction. The polysaccharide can be degraded after the cationisation reaction to the desired molecular weight level. This is practical in productional point of view, because the cationisation process not necessarily requires the pre-modification, e.g. pre-degradation of the polysaccharide.

Water content of the reaction mixture is a critical parameter in the cationisation of starch. A good parameter to define the water quantity is the ratio of water and starch i.e. water/starch-ratio (W/S-ratio) which is the weight base-ratio of the amounts of water and starch in the reaction mixture. If the W/S-ratio is over 1.4 the reaction yield will be poor with what ever reaction temperature and with what ever catalyst quantity. The reason for that is that the high water concentration increases the hydrolysis reaction of EPTAC to DHPTAC, which thus decreases the process yield. It has also been observed that there is a minimum W/S-ratio, below which the reaction yield will start to worsen. There must be an adequate amount of water present in the reaction mixture in order to get the cationisation reaction to happen with good yield.

If the water amount in the reaction mixture is not adequate, the formation of starch alcoxides start to slow down, which will decrease reaction speed of the main reaction. Even though the hydrolysis in such reaction mixture is also slow, there are other secondary reactions which together will become more dominant. These include for example the formation of 3-hydroxypropenyltrimethylammonium chloride (HPTAC) and further the reactions between EPTAC and HPTAC, DHPTAC, which will lead to dimeric or possibly even polymeric structures. The secondary reactions has plenty of importance especially in reaction mixtures in which MR is above 0.5, because in such reaction mixtures the concentration of EPTAC is high enough to cause remarkable quantity of total secondary reactions. If catalyst concentration and temperature are adequate, but W/S-ratio is low, the target reaction of EPTAC with starch alcoxide will be prevented and EPTAC will react with something else in the reaction mixture.

It can be summarised that if there is plenty of water in the reaction mixture the process yield will be low in any case. If water quantity is low, the reaction speed between EPTAC and starch will slow down and the side reactions of EPTAC will become significant and the reaction yield will be low. However, especially at low W/S-ratios, temperature and catalyst quantity have a significant impact to the reaction yield. If temperature and catalyst concentration are low enough, W/S-ratio can be decreased. The optimal W/S-ratios are between 0.7-1.4. Especially good yield will be achieved with W/S-level between 0.8-1.2. If W/S-ratio is below 0.7 the reaction speed start to slow down and reaction time will be too long.

Reaction temperature has a remarkable impact to the cationisation reaction when cationic starches of DS over 0.5 are on target. In the beginning of the reaction, EPTAC concentrations of the reaction mixtures are typically very high. For example if W/S-ratio is 0.9, EPTAC concentration is around 200 g/kg (reaction mixture) with MR 0.5, around 330 g/kg with MR 1.0 and around 420 g/kg with MR 1.5. The start concentration value of EPTAC thus depends on MR-value. It has been observed that if the concentration of EPTAC in the beginning is over 130 g/kg, more optionally over 150 g/kg and most optionally over 190 g/kg and temperature of the reaction mixture is high, the impact on yield will be negative. This is probably due to fact that the activation energy of the reaction between EPTAC and starch is lower compared to activation energy of the secondary reactions of EPTAC. This means that if reaction temperature is low enough the cationisation yield will be good even though the start concentration of EPTAC is high. Optimal temperature is around 5-50° C., and more optimally 10-35° and most optimally 20-30° C. If start concentration of EPTAC is above 200 g/kg and reaction temperature is above 50° C., the yield of the cationisation reaction will be poor.

The reaction between EPTAC and starch is a catalysis reaction catalysed by base. Suitable bases as catalyst are inorganic bases e.g. sodium hydroxide, potassium hydroxide, lithium hydroxide and calcium hydroxide. The most suitable one is sodium hydroxide, which is referred in the discussion and in the experiments, but other mentioned hydroxide catalysts with the same stoicheiometric quantity can be used as well. The catalyst concentration affects on the reaction yield. If the catalyst concentration is too high, secondary reactions will take place, even with optimal reaction temperature. However these secondary reactions can be partly avoided by lowering the temperature. If the catalyst concentration is too low, reaction speed decreases and the time for complete reaction increases. It is not practical in production point of view if the reaction time is too long, even though the yield is good. Preferably the catalyst concentration is between 0.3-4.0% of dry starch, more preferably 0.5-2.5% and most preferably 0.7-1.5%. Typically commercial EPTAC products contain small quantities of CHPTAC as a stablising agent. If EPTAC product contains CHPTAC a stoicheiometric quantity of catalyst must be added to the catalyst dosage.

Both of the two cationising agents, EPTAC and CHPTAC can be used as a cationising agent in the process to produce cationic starches with DS over 0.5. However due to equivalent quantity of base, which is needed to convert CHPTAC to EPTAC, the use of CHPTAC requires much higher quantities of base, first the quantity to convert CHPTAC to EPTAC and then the catalytic quantity. The higher base dosage with CHPTAC will increase the probability to get part of the raw material starch to be gelatinised during the making of reaction mixture and thus to the formation of unhomogenous reaction mixture. In addition the conversion of CHPTAC to EPTAC liberates one equivalent of sodium chloride salt to the reaction mixture, which increases the corrosivity of the final product. In that point of view, even though CHPTAC can be used as a cationising agent, EPTAC is considered as the preferred cationising agent.

In order to calculate the reaction mixtures according to invention and which thus have the target W/S-ratio, it must be pointed out that the water which exists in starch powder, cationising agent and catalyst has to be observed in the recipe calculation. Reaction mixture consists thus starch, cationising agent, catalyst and additional water. Additional water means that water which is not present in e.g. starch, cationising agent or catalyst solution.

Powder like starch is preferred to make reaction mixtures according to invention. Starch in aqueous slurry has typically maximum starch content around 44% and practical maximum concentrations are around 42%. If starch slurry is used, the water quantity in the slurry is typically too high and it is impossible to get W/S-ratio according to invention without evaporation of water, and therefore powdered starch is preferred.

However reaction mixtures are easy to make because concentration of cationising agent in the reaction mixture is high i.e. above 170 g/kg and cationising agent can be used as slurrying agent too. It is thus practical to dose cationising agent and water first. It is not necessary to dose all of the water at first, but some of the additional water can be used for dilution of catalyst solution. There is practically no difference if water or cationising agent is dosed first. When cationising agent and water is mixed, then starch powder can be slurried into the mixture. The result will be starch slurry with moderate or even low viscosity, into which catalyst can be dosed. In order to avoid gelatinisation of starch in the slurry, catalyst is preferred to dose in 5-20% aqueous solution, the rest of the total water can used for dilution of catalyst. Even 50% sodium hydroxide can be used, but in that case adequate agitation is required. It is also preferred that temperature is between 5-35° C. when catalyst is dosed. If temperature is higher starch granules may gelatinise, especially if catalyst concentration is high. When catalyst is dosed in a proper way, the reaction mixture is homogenous slurry, without any clumps and the cationisation reaction starts.

The reaction mixture is homogenous slurry at start. Viscosity of the slurry is typically low or moderate and the appearance of the slurry is like the appearance of common starch slurry. Viscosity values around 50-1500 mPas are typical at the start. For example viscosity of the reaction mixture with W/S 0.95 and MR 0.8 was measured to be 75 mPas at 25° C.

Reaction speed depends on temperature and catalyst concentration, but with optimal temperature and catalyst concentration, viscosity stays low for 2-10 hours. It is beneficial that viscosity doesn't increase much at the start, because it indicates slow enough reaction rate, which favours the main reaction. If viscosity is low, less than two times the start viscosity after 10 hours, it means that reaction speed is too slow and total reaction time will be too long. When the reaction proceeds and cationicity of the starch granules increases, the granules start first to swell and then partly gelatinise. This can be observed in the thickening of the reaction mixture. Viscosity increases in function of time, starting from the said 50-1500 mPas and reaching values up to 20 000-50 000 mPas. The reaction mixture is at this stage viscous homogenous slurry. The cationisation reaction proceeds as well as the thickening, reaching a stage, in which the state of the high viscous slurry will change to a mixture like baking dough or thick paste. As the cationisation reaction goes on further, the thick-paste-like reaction mixture starts to turn to moist-powder-like mixture. The reason of unexpected behaviour is probably that starch has reached a cationicity level at which it start to gelatinise without the impact of heat. Because of the limited water content in the reaction mixture, there is not enough water to get starch in dissolved form and the water is absorbed into the mixture, which thus turns to powder like.

When the reaction mixture according to invention has reached the moist-powder-state, the most of the cationising agent has been reacted. To get the reaction fully completed it is preferable to proceed at the reaction temperature, e.g. 30-50° C. However, in order to speed up the reaction, it is also possible to increase the reaction temperature when the unreacted EPTAC concentration is below 20%, preferably below 10%. The temperature should not exceed 100° C., preferably not 70° C. and most preferably not 50° C. Above 70° C. colour forming reactions will start to take place and the colour of the dissolved product will get yellowish or even dark. In addition, at temperature above 50° C. the tackiness of the reaction mixture increases and drying of the reaction mixture will get difficult.

When the cationisation reaction is complete after moist-powder-stage, there are several possibilities to proceed, which depends at what matrix the cationic starch of DS above 0.5 is preferred and what is the required purity. It is possible to produce the starch in liquid form as aqueous solution, but it is also possible to produce the starch in powder form. Also if the purity of the cationic starch is not adequate, it is possible to purify the starch by solvent washing. Either way is chosen, the stage in which the process can be separated is the moist-powder-stage.

If cationic starch in aqueous solution is preferred, the following treatment can be done. Reaction mixture in which cationisation reaction is complete, which means in this case that EPTAC concentration of the reaction mixture is below 1000 ppm, or more preferably below 200 ppm, or most preferably below 50 pmm is dissolved in water. Even cold water can be used, because the cationic starches with DS above 0.15 are soluble in cold water. But the dissolution speed if faster if warm e.g. 60° C. or even hot e.g. 95° C. water is used. Depending on the raw material starch, the viscosity of the dissolved starch may be too high and in that case the viscosity can be decreased by suitable degradation mean, such as by oxidant, by acid catalysed hydrolysis or by enzymes. The most preferred method is degradation with an oxidising agent, especially with hydrogen peroxide. If hydrogen peroxide is used as a degradation agent, small quantity of copper (II) is required as a degradation catalyst, suitable quantity is 25-100 ppm of the quantity of raw material starch. Optimal pH during oxidation reaction is between 6-9. The suitable hydrogen peroxide quantity is form 0.1-10% of absolute hydrogen peroxide calculated from the quantity of dry raw material starch originally in the reaction mixture. The hydrogen peroxide dosage impacts on the molecular weight of the final cationic starch and the amount of it depends on the target molecular weight.

If cationic starch in powder form is preferred, the process proceeds in the following way. Reaction mixture in which cationisation reaction is complete, which means in this case that EPTAC concentration of the reaction mixture is below 1000 ppm, or more preferably below 200 ppm, or most preferably below 50 pmm is dryed with suitable dryer, e.g. with vacuum dryer. Suitable dry substance content is between 80-95%. Drying makes the moist powder matrix to fine powder type, especially if there is shear during the drying period. Cationic starch can be neutralised prior the drying procedure. Suitable acids are dry acids such as citric acid or adipic acid. But also diluted mineral acid such as hydrochloric acid can be used as well. The quantity of acid is 1.0 equivalent of the quantity of catalyst. It is also possible to neutralise the cationic starch in powder form. In that case dry or gaseous acids are preferable. Dry acids can be e.g. citric acid or adipic acid. Gaseous acid is preferably hydrochloric acid gas or carbon dioxide. Neutralisation with carbon dioxide is preferred.

Particle sizes of different botanical starches are varying between 2-100 µm. The number averages are varying between 5-33 µm. It has been observed that dry powder starches according to invention have increased particle size, typically particle size number average is between 75-1500 µm, more typically between 75-1000 µm. Increased particle size is due to partial dissolving of starch granules during the reaction stages before moist-powder stage. Increased particle size is beneficial in dusting point of view. High cationic starch powder is less dusty when particle size number average is over 75 µm. On the other hand cationic starch with DS above 0.2 is soluble in cold water and such kind of starch can be dissolved is cold water with commercial dissolving units. However, if particle size is above 1500 µm, dissolution speed will be too slow. It is thus beneficial that particle size number average is between 75-1500 µm.

If cationic starch of DS above 0.5 in powder form is preferred and maximum product purity is preferred, which means in this case, that the quantity of unbound nitrogen containing compounds of the cationising agent is below 3%, more preferably below 2% and most preferably below 1% of the quantity of dry cationic starch. The unbound nitrogen containing compounds mean hydrolysis and other side reaction products of EPTAC as well as unreacted EPTAC and CHPTAC i.e. the quaternary compounds which are not covalently bonded into starch. Such high purity starch is possible to produce if the reaction mixture in which cationisation reaction is considered as complete, which means in this case that EPTAC concentration of the reaction mixture is below 1000 ppm, or more preferably below 200 ppm, or most preferably below 50 pmm is washed with a suitable solvent into which the quaternary unbound compounds will dissolve, but the polysaccharide polymers doesn't. Examples of such solvents are alcohols e.g. methanol, ethanol, iso-propanol, n-propanol and butanol and acetone.

In addition solvent washing impacts on the appearance of the cationic starch. If the reaction mixture is not dried, the appearance is not totally powder like but a little bit tacky, which makes the handling of it slightly complicate. If the tacky mixture is treated with ethanol, the appearance of the cationic starch changes to a powder like. This improves the handling of the cationic starch product. The reason of the change is supposed to be due to precipitation of partly dissolved starch which makes the reaction matrix tacky. When the partly dissolved starch precipitates the handling of the mixture is like handling of slurry. The slurry is easy to filter, re-wash and dry.

It is beneficial to wash the reaction matrix compared to dried or dissolved cationic starch. Washing efficiency is better with reaction matrix or dried cationic starch compared to dissolved product. The washing efficiency with reaction matrix or dried cationic starch powder is good and handling of the slurries is quite easy. Treatment of dissolved cationic starch with ethanol leads to precipitation of the polymer with side-reaction compounds of EPTAC as co-precipitate. The precipitate is typically gum like and difficult to handle especially in large scale.

States of the reaction mixture at different reaction stages differ remarkably from each other, which is problematic in manufacturing point of view. However, it has been observed that low shear mixer, especially conical screw mixer is suitable for handling the reaction mixtures according to the invention. Mixing in the conical mixer is arranged with a rotating screw and a rotating orbital arm. The rotation speed of the screw is optimally 20-300 rpm and the rotating speed of the orbital arm 0.1-10 rpm. With the conical screw mixer all the states of the reaction mixtures, observed in the different reaction stages, can be agitated successfully. As a principle, the reaction states, which are flowing like liquids, can be agitated by keeping the rotation direction of the screw upwards or downwards. The mixing is better, if the direction is downwards. When the state of the reaction mixture is thick paste or moist powder the rotation direction must be upwards, otherwise the mixing screw or the agitating motor thereof may be damaged. By changing the rotation direction, it is possible to achieve proper agitation at each reaction stage. It is also possible and practical to use conical screw mixer for dissolving the produced cationised polysaccharide with water. The low shear and low intensity mixing kneads the mixture to homogenous high viscous liquid, which can be processed further, e.g. degraded as described earlier. A suitable conical mixer is for example Vrieco-Nauta-mixer made by Hosokawa Micron.

Low shear mixer, preferably conical screw mixer, is applicable also to produce cationic polysaccharides other than DS over 0.5, e.g. cationic polysaccharides, preferably cationic starches, with DS 0.1-0.5.

It is also possible to cross-link starch prior, simultaneopusly or after cationisation reaction. Cross-linking simultaneously with cationisation is preferred.

High cationic starches can be used commercially as fixatives in paper making process. The function of cationic starches then is to reduce the amount of dissolved or colloidal substances (DSC), which has typically anionic charge i.e. so called anionic trash, in the white water. These substances origin typically e.g. from wood (pitch compounds) or from synthetic binders (white pitch). High loads of anionic trash impact on runnability of the paper machine by increasing the frequency of web brakes, by blocking up the wires. It is thus important that their amount is maintained at low enough level. In order to reduce the amount of DSC, fixatives are commonly used. Typical fixatives are cationic synthetic polymers, which can build up agglomerates with DSC and attach them onto fibres, fillers and fines, so that they end up in the final paper sheet. Typical fixatives are low MW synthetic polymers such as polyamines, polyethyleneimine or poly-DADMAC (poly-diallyldimethylammonium chloride). Cationic starches with DS between 0.1 and 0.8 and $MW_{Average}$ below 25 000 000 Dalton are also used for fixing of DSC. More information of fixation of DSC is presented in the book "Papermaking Chemistry, Book 4, (ISBN 952-5216-04-7), pages 222-251).

It has been observed that cationic starches according to invention with $MW_{Average}$ over 30 000 000 Dalton, more preferably over 40 000 000 Dalton, most preferably starches with starch backbone not degraded or cross-linked, can be used as fixing agents. Unexpectedly it is observed that their performance for fixing of anionic trash (e.g. pitch compounds and white pitch) is better compared to performance of commercial cationic starch fixatives. DS can be between 0.2 and 1.0, more preferable between 0.3 and 0.9.

A good fixing-performance has been observed for mechanical stocks and coated broke. Especially good fixing-performance has been observed for TMP and coated broke.

It must be pointed out that even though it is beneficial to use cationic starch of high purity, e.g. due to environmental reasons, a nearly as good technical performance can be achieved also with less pure cationic starches, which has BNI below 0.75. The important parameter is that $MW_{Average}$ is over 30 000 000 Dalton, more preferable over 40 000 000 Dalton and most preferably the starch backbone of cationic starch is not degraded or cross-linked.

As retention and drainage aid, the novel cationic starches may be added as single component or as part of dual or multi component systems at any convenient point to the furnish at any time prior to sheet formation, for instance in the thin stock suspension or alternatively in the thick stock suspension. In some cases it may be desirably to add the starch into the mixing chest, blend chest or perhaps into one or more of the stock components. Preferably however, the high molecular weight, high cationic starch is added to the thin stock. The exact point of addition may be before or after one or more of the shear stages. Typically such shear stages include mixing, pumping and cleaning stages or other stages that induce mechanical degradation of flocs. Desirably the shear stages are selected from one of the fan pumps or centriscreens. Preferably the starch is added after the centriscreen, and in this regard very close to the headbox or in some cases where a dilution headbox is present even into the headbox via the dilution water.

The starch may be used as part of dual or multi component systems, such as described in the previous paragraph. Often filled mechanical paper grades such as SC paper or coated rotogravure paper is made using a dual polymer retention system. This employs the use of two cationic water-soluble polymers that are blended together as aqueous solutions before their addition to the thin stock. The high cationic starch may be blended together with a second water-soluble cationic retention aid, such a high molecular weight polyacrylamide or a polyvinylamine or amphoteric block copolymer. The blend of cationic polymers is commonly referred to as a cat/cat retention system. In some circumstances it may be useful to add the two materials sequentially. The cationic starch may be added prior to the water-soluble cationic or amphoteric polymer or alternatively it may be added subsequent to the water-soluble cationic or amphoteric polymer.

In yet another aspect of the process the cationic starch may be added as first component of the retention/drainage system to the cellulosic suspension and then the flocculated suspension so formed is passed through one or more shear stages. The second component of retention/drainage system may be added to reflocculate the suspension, which then may be subjected to further mechanical shearing. The sheared reflocculated suspension may also be further flocculated by addition of a third component of the retention/drainage system. It is also possible to add the third component simultaneously with the second component of the retention/drainage system. A three component retention/drainage system is for instance where anionic micropolymer and/or siliceous material such as bentonite or silica are used in addition to the high cationic starch of the present synthesis process. Suitable anionic micropolymers can be substantially linear, branched or crosslinked. Patent publications WO-A1-9829604, U.S. Pat. No. 5,167,766 and U.S. Pat. No. 5,27,4055 can be adduced as examples for structured anionic micropolymers, respectively anionic, organic microbeads.

In the process the cationic starch may be added after the addition of a water-soluble anionic polymer, which is particularly useful for making filled mechanical paper grades. In this connexion the cationic starch may also be used in addition to a water-soluble cationic or amphoteric polymer, e.g. in a so called cat/cat system.

The cationic starch of the invention may suitably be added to the cellulosic suspension at a dose of at least 50 g per tonne based on the dry weight, for instance in cat/cat retention/drainage systems. The amount may be as much as 5000 or 6000 g per tonne or higher. Preferably the dose will be between 500 g per tonne and 2000 g per tonne, more preferably between 300 g per tonne and 1000 g per tonne. All doses are based on dry weight of active polymer on the dry weight of cellulosic suspension.

The paper furnish for making paper or paperboard can contain any type of short or long fibre chemical pulp, for instance pulps made with the sulphite or sulphate (Kraft) process. In contrast to mechanical pulps the lignin is widely removed from chemical pulps. The furnish may also contain up to 100% by weight recycled fibre and/or mechanical fibre. By recycled fibre we mean that the cellulosic suspension comprises recycled fibre, indicating any resuspended paper or paperboard product, such as untreated waste paper, any type of broke (e.g. coated broke) or deinked recycled pulp (DIP). By mechanical fibre we mean that the cellulosic suspension comprises mechanical pulp, indicating any wood pulp manufactured wholly or in part by a mechanical process, including stone ground wood (SGW), thermomechanical pulp (TMP), chemithermomechanical pulp (CTMP), bleached chemithermomechanical pulp (BCTMP), pressurised ground wood (PGW) or mixtures thereof. Mechanical paper grades contain different amounts of mechanical pulp and this is usually included in order to provide the desired optical and mechanical properties. In some cases the pulp used in making the paper or paperboard may be formed of entirely of one or more of the aforementioned mechanical pulps. In addition to mechanical pulps other pulps are often included in the cellulosic suspension. Typically the other pulps may form at least 10% by weight of the total fibre content. These other pulps in the paper recipe may include deinked pulp and chemical pulp.

The cellulosic suspension may contain other ingredients such as cationic starch for strength and/or additional coagulants. Typically the cationic starch and/or coagulants may be present in the paper stock before the addition of the retention/drainage system comprising the novel starch. The cationic starch may be present in an amount between 0 and 5%, typically between 0.2 and 1% by weight of cellulosic fibre. The coagulant will usually be added in amounts of up to 1% by weight of the cellulosic fibre, typically between 0.02 and 0.5%.

The paper or paperboard made by using starches as disclosed in the invention may be filled. Desirably the filler may be a traditionally used filler material. For instance the filler may be a clay such as kaolin, or the filler may be a calcium carbonate which may be ground calcium carbonate or preferably precipitated calcium carbonate (PCC). Another preferred filler material includes titanium dioxide. Examples of other filler materials also include synthetic polymeric fillers.

Examples

The following examples illustrate the invention, without intending to be restrictive in nature; parts and percentages are by weight, unless otherwise indicated. Thus, the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope is to be determined only by the appended claims and their equivalents.

Example 1

Raw Materials

Oxidised potato starch, dry solids: 89.5%. Brookfield viscosity of cooked starch: 150 mPas (5% solution at 60° C.)
Cationising agent: EPTAC (73.1%), CHPTAC (1.2%), secondary compounds (2.5%), moisture content: 23.2%.
Sodium hydroxide (50%)
Water Procedure Cationising agent and water was weighed into the glass reactor, equipped with mechanical agitator and thermometer. Oxidised potato starch powder was slurried into the reagent-water-mixture with agitation on. The mixture was heated to 30° C. in a water bath and sodium hydroxide solution was dosed into the mixture by drops with agitation on. Temperature of the water bath was increased to 50° C. with hot water and the reaction mixture was kept in the water bath for 8 hours. When the cationisation reactions were complete, the products were diluted with water and pH were adjusted to 10.8 with hydrochloric acid and dry solids concentrations were adjusted to 20.0%. Viscosities were measured with Brookfield viscometer at 20° C. A sample of the product was dried in the oven (4 h, 120° C.) for $N_{Total}$-analysis. A sample of the product was precipitated with ethanol and washed with ethanol, and dried in the oven (4 h, 120° C.) for $N_{Bound}$-analysis. Nitrogen contents of the dry starches were determined with Kjeldahl method.

A series of cationic starches were made. Molar ratio of cationising agent and starch anhydroglucose unit was 0.93 in each experiment. Water/starch ratio was varying between 1.74 and 0.5. Raw material dosages and water/starch ratios are presented in the table 1.

TABLE 1

| Exp | Starch (g) | Cat. agent (g) | Water (g) | NaOH (50%) (g) | W/S-ratio | MR |
|---|---|---|---|---|---|---|
| 1A | 200.0 | 210.4 | 237.2 | 8.95 | 1.74 | 0.93 |
| 1B | 200.0 | 210.4 | 185.3 | 8.95 | 1.45 | 0.93 |
| 1C | 200.0 | 210.4 | 140.5 | 8.95 | 1.20 | 0.93 |
| 1D | 200.0 | 210.4 | 95.8 | 8.95 | 0.95 | 0.93 |
| 1E | 200.0 | 210.4 | 68.9 | 8.95 | 0.80 | 0.93 |
| 1F | 200.0 | 210.4 | 51.0 | 8.95 | 0.70 | 0.93 |
| 1G | 200.0 | 210.4 | 33.1 | 8.95 | 0.60 | 0.93 |
| 1H | 200.0 | 210.4 | 15.2 | 8.95 | 0.50 | 0.93 |

Parameters of the products are presented in table 2.

TABLE 2

| Exp | W/S-ratio | $N_{Bound}$ (%) | DS | Yield (%) | $N_{Total}$ (%) | $MR_{N-Total}$ | BNI | Viscosity (mPas) |
|---|---|---|---|---|---|---|---|---|
| 1A | 1.74 | 3.53 | 0.66 | 71 | 4.34 | 0.95 | 0.70 | 2450 |
| 1B | 1.45 | 3.69 | 0.71 | 76 | 4.33 | 0.94 | 0.75 | 2350 |
| 1C | 1.20 | 3.74 | 0.73 | 78 | 4.33 | 0.94 | 0.77 | 2520 |
| 1D | 0.95 | 3.85 | 0.76 | 82 | 4.32 | 0.94 | 0.81 | 2470 |
| 1E | 0.80 | 3.71 | 0.72 | 77 | 4.32 | 0.94 | 0.76 | 2510 |
| 1F | 0.70 | 3.56 | 0.67 | 72 | 4.33 | 0.94 | 0.71 | 2370 |
| 1G | 0.60 | 3.47 | 0.64 | 69 | 4.31 | 0.94 | 0.69 | 2410 |
| 1H | 0.50 | 3.20 | 0.57 | 61 | 4.33 | 0.94 | 0.60 | 2430 |

Results of the example 1 show the impact of water in the reaction mixture to the cationisation yield. At first the decrease of water in the reaction mixture improves the cationisation yield. But if the water concentration is low the formation of secondary compounds will become more dominant and the yield will decrease. Optimal W/S-ratio at 50° C. is between 0.8-1.2.

Example 2

Raw Materials:

Native potato starch, dry solids: 86.3%
Cationising agent: EPTAC (73.3%), CHPTAC (1.2%), secondary compounds (2.4%), moisture content: 23.1%.
Sodium hydroxide (50%)
Water Procedure Cationising agent and water was weighed into a glass reactor, equipped with a mechanical agitator. Native potato starch powder was slurried into the reagent-water-mixture with agitation on. Sodium hydroxide solution was dosed into the mixture by drops with agitation on. Homogenous reaction mixture was transferred to a cylinder and the lid was tightly closed. The cylinder was shaked 168 h at 20° C. A sample of the product was dried in an oven (4 h, 120° C.) for $N_{Total}$-analysis. A sample of the product was washed three times with ethanol-water (75 w-%/25 w-%), and dried in the oven (4 h, 120° C.) for $N_{Bound}$-analysis. Nitrogen contents of the dry starches were determined with Kjeldahl method.

A series of cationic starches were made. Molar ratio of cationising agent and starch anhydroglucose unit was 1.00 in each experiment. Water/starch ratio was varying between 1.8 and 0.5. Raw material dosages and water/starch ratios are presented in the table 3.

TABLE 3

| Exp. nb. | W/S | Cat. agent (g) | Water (g) | Starch (g) | NaOH (50%) (g) | Total (g) |
|---|---|---|---|---|---|---|
| 1 | 1.8 | 45.7 | 48.5 | 42.0 | 0.96 | 137 |
| 2 | 1.4 | 51.1 | 38.0 | 47.0 | 1.07 | 137 |
| 3 | 1.2 | 54.4 | 31.8 | 50.0 | 1.14 | 137 |
| 4 | 1.0 | 57.7 | 24.6 | 53.0 | 1.21 | 136 |
| 5 | 0.9 | 59.8 | 20.7 | 55.0 | 1.26 | 137 |
| 6 | 0.8 | 62.0 | 16.6 | 57.0 | 1.30 | 137 |
| 7 | 0.7 | 64.2 | 12.1 | 59.0 | 1.35 | 137 |
| 8 | 0.6 | 67.4 | 7.3 | 62.0 | 1.41 | 138 |
| 9 | 0.5 | 69.6 | 2.0 | 64.0 | 1.46 | 137 |

Results are presented in the table 4.

TABLE 4

| Exp. nb. | W/S | Appearance | $N_{Bound}$ (%) | DS | Yield (%) | $N_{Total}$ (%) | $MR_{N\text{-}Total}$ | BNI |
|---|---|---|---|---|---|---|---|---|
| 1 | 1.8 | gum | 3.74 | 0.73 | 72.7 | 4.44 | 0.99 | 0.74 |
| 2 | 1.4 | gum | 3.81 | 0.75 | 75.1 | 4.46 | 1.00 | 0.75 |
| 3 | 1.2 | moist powder | 3.99 | 0.81 | 81.3 | 4.47 | 1.00 | 0.81 |
| 4 | 1.0 | powder | 4.05 | 0.83 | 83.3 | 4.42 | 0.98 | 0.85 |
| 5 | 0.9 | powder | 4.11 | 0.86 | 85.7 | 4.43 | 0.99 | 0.87 |
| 6 | 0.8 | powder | 4.07 | 0.84 | 84.2 | 4.47 | 1.00 | 0.84 |
| 7 | 0.7 | moist powder | 3.93 | 0.79 | 79.2 | 4.40 | 0.97 | 0.81 |
| 8 | 0.6 | thick slurry | 1.69 | 0.24 | 23.9 | 4.39 | 0.97 | 0.25 |
| 9 | 0.5 | thick slurry | 0.69 | 0.09 | 8.6 | 4.37 | 0.96 | 0.09 |

Results of the example 2 show the impact of temperature to reaction yield. Reaction yield with optimal W/S-ratios are better compared to corresponding reaction yields in the example 1, even though MR in the series is higher. Optimal W/S ratio at 25° C. is between 0.7-1.2. Reaction nearly stops below W/S 0.6.

Example 3

Raw Materials:
Native potato starch, dry solids content 86.0%
Cationising agent: EPTAC (72.4%), CHPTAC (1.1%), secondary compounds (4.2%), water (22.3%)
Sodium hydroxide (10%)

Cationising agent (320.4 kg) and tap water (143.8 kg) was dosed into conical mixer (Hosokawa Micron 10-WSC-43, volume 1000 l. The mixer was equipped with high shear intensifier). Native potato starch (400.0 kg) was slurried into the liquid material. The screw agitator and the intensifier were on during the dosing of starch. Sodium hydroxide (10%, 42.6 kg) was dosed into the slurry. The screw agitator and the intensifier were on during the dosing of sodium hydroxide. When all of the sodium hydroxide was dosed the mixture was agitated for 15 min. After that 403.7 kg of the reaction mixture was drained into a separate reaction vessel. The quantity of reaction mixture which was remained into the conical reactor was thus 476.1 kg. W/S ratio of the reaction mixture was 0.90.

The mixture in the conical reactor was kept at 20-25° C. for 2 hours, then 25-35° C. for 5 hours Then the reaction mixture was heated to 60° C. and kept at the temperature for two hours. After that 569.0 kg of water was dosed within 1 hour time into the reaction mixture in order to dissolve the cationic starch. After 1 hour agitation the cationic starch in the reaction mixture was totally dissolved and the high viscous cationic starch liquid was achieved. The mixture was then neutralised with 2.5 kg acetic acid (80%). After that copper sulphate pentahydrate (18.1 g) was dosed into the dissolved reaction mixture. The mixture agitated for 30 min. Hydrogen peroxide (35%, 800 g) was dosed within 30 min into the reaction mixture. When hydrogen peroxide had reacted (test with hydrogen peroxide tester), the reaction mixture was cooled to 23° C., and neutralised with 1.7 kg acetic acid (80%). The reaction mixture was poured into a separate vessel and diluted to dry solids content of 20.0% with water. The product was analysed in the same manner as in the experiment 1. The following analysis results were measured: $N_{Bound}$ 3.49%, $N_{Total}$ 3.83%, viscosity at 23° C. 1480 mPas, pH 4.9.

DS of the cationic starch was 0.65. $MR_{N\text{-}Total}$ was 0.76. BNI value was 0.86. The yield of the cationisation reaction was 89%.

Example 4

Raw Materials:
Native potato starch, dry solids content 85.0%
Cationising agent: EPTAC (72.5%), CHPTAC (1.1%), secondary compounds (3.6%), water (22.8%)
Sodium hydroxide (10%)
Water Cationising agent (29 g) and water (35 kg) was dosed into a conical mixer (Hosokawa Micron vacuum dryer, type 3-HDC-43, volume 300 l, vacuum dryer). Starch (60 kg) was slurried into the mixture. Sodium hydroxide (10%), (6.3 kg) was added slowly while the mixture was agitated. Water (15 kg) was evaporated with vacuum (0.02 bar). Product temperature was 15° C. during the drying period. Jacket temperature was 50° C. After vacuum drying W/S-ratio of the mixture was 0.80. Viscosity of the reaction mixture was about 1000 mPas. Reaction mixture was agitated at 20-25° C. for 14 hours. Appearance of the reaction mixture was high viscous slurry, viscosity about 15 000 mPas. Temperature of the reaction mixture was increased form 20° C. to 52° C. within 3 hours. Appearance of the reaction mixture changed from high viscous slurry to baking dough and finally to a moist-powder. Vacuum drying was started at moist-powder stage. Vacuum was kept at 0.02 bar. Product was dried for 5 hours. Jacket temperature was 70° C. for 1 hour and 90° C. for 4 hours.

Final product was a powder. Dry solids content was 86.9%. Product was totally soluble in water at 20° C. The product was analysed in the same manner as in the experiment 2. The following analysis results were measured: $N_{Bound}$ 2.55%, $N_{Total}$ 2.74%. DS of the cationic starch was 0.41. $MR_{N\text{-}Total}$ was 0.45. BNI value was 0.91. The yield of the cationisation reaction was 92%.

A sample of the product was sieved with Fritcsh sieving apparatus, using 1.0 mm and 75 μm screens. 0.9% of the product had particle size below 75 μm. 95.4% of the product had particle size between 75 μm-1.0 mm. 3.7% of the product had particle size over 1.0 mm.

Example 5

Fixation properties of cationic starches were tested. Fixation tests were done in the following manner: 300 ml sample of the stock was mixed (1000 rpm) in the mixing pot. Additives were dosed after 1 min mixing. Mixing was continued 1 min. The sample was vacuum filtered through 400 μm plastic wire. Filtrate was analyzed. The amount of white pitch particles were analysed with Ciba Contaminant Analyzer. Three products (A-C), which were made according to invention, were tested. The tested products were high cationic potato starches, which were made in the manner described in the example 2. The starch backbone was not degraded. Starches were dissolved in water before they were dosed into the stock. Two commercial high cationic starch fixatives (D and E) were used as a reference. Both of the products were aqueous solutions. Product D was 20% and product E was 40% aqueous solution. A commercial synthetic fixative polyamine, co-polymer of epichlorohydrin and dimethylamine (F) was also used as a reference. All chemicals were used as 1% aqueous solutions.

TABLE 5

Products in the fixation test

| Product | Type | N-content (%) | BNI | MW$_{Average}$ Dalton |
|---|---|---|---|---|
| A | Cationic starch | 2.5 | 0.92 | 200 000 000 |
| B | Cationic starch | 3.2 | 0.91 | 200 000 000 |
| C | Cationic starch | 4.1 | 0.87 | 200 000 000 |
| D | Commercial cationic starch | 3.7 | 0.70 | 20 000 000 |
| E | Commercial cationic starch | 3.6 | 0.71 | 2 000 000 |
| F | Commercial polyamine | | | 140 000 |

Test stock: Coated broke, consistency 3.0%, pH 7.5, Schopper-Riegler: 20. Filtrate was diluted 1:10 with water, before particle size analysis.

TABLE 6

Analysis results of the diluted filtrate.

| Test nb. | Additive | Dosage (g/t) | White pitch particles (n/ml) |
|---|---|---|---|
| 1 | Blank | 0 | 3 150 000 |
| 2 | A | 800 | 1 110 000 |
| 3 | B | 800 | 775 000 |
| 4 | C | 800 | 1 050 000 |
| 5 | E | 800 | 1 800 000 |
| 6 | F | 800 | 1 340 000 |

The results show that all high molecular weight starches perform well as fixatives for coated broke. Cationic starch B was the best fixative in the series.

Test stock: Mechanical pulp (fresh TMP-pulp from paper mill), consistency 3.5%, pH 5.0, Freeness 95.

TABLE 7

Analysis results of the filtrate

| Test nb. | Fixative | Dosage (g/t) | Pitch particles (n/ml) |
|---|---|---|---|
| 1 | Blank | 0 | 18 000 000 |
| 2 | B | 500 | 6 500 000 |
| 3 | D | 500 | 15 500 000 |
| 4 | F | 500 | 11 000 000 |
| 5 | B | 1000 | 1 300 000 |
| 6 | D | 1000 | 7 200 000 |
| 7 | F | 1000 | 7 400 000 |

Results show that cationic high molecular weight starch performs well as a fixative for mechanical pulp. Cationic starch B was the best fixative in the series.

Test stock: Mechanical pulp (fresh TMP-pulp from paper mill), consistency 3.4%, pH 5.1, Freeness 90.

TABLE 8

Analysis results of the filtrate

| Test nb. | Additive | Dosage (g/t) | Pitch particles (n/ml) |
|---|---|---|---|
| 1 | Blank | 0 | 38 000 000 |
| 2 | A | 500 | 11 500 000 |
| 3 | D | 500 | 25 900 000 |
| 4 | F | 500 | 29 500 000 |
| 5 | A | 1000 | 6 900 000 |
| 6 | D | 1000 | 22 200 000 |
| 7 | F | 1000 | 28 500 000 |

Results show that high cationic starch performs well as a fixative. Cationic starch A was the best fixative in the series.

Example 6

The following application example shows the superior performance of the novel starches in terms of formation and drainage by comparison to commercial starches and polyacrylamide retention aids.

The products starch No. 1, 2, 3 and 4 listed in table 9 are made in accordance to the invention. These are compared against commercial products.

TABLE 9

| Polymer | MW | Form | Cationicity | DS | Remark |
|---|---|---|---|---|---|
| Starch No. 1 | 200.000.000 g/mol Undegraded starch backbone | Potato starch powder with 89.6% actives | N-content of 4.0% | 0.82 | Laboratory product, soluble in cold water |
| Starch No. 2 | 300.000.000 g/mol Crosslinked starch backbone | Potato starch powder with 90.7% actives | N-content of 4.0% | 0.82 | Laboratory product, soluble in cold water |
| Starch No. 3 | 400.000.000 g/mol Crosslinked starch backbone | Potato starch powder with 92.9% actives | N-content of 4.0% | 0.82 | Laboratory product, soluble in cold water |

TABLE 9-continued

| Polymer | MW | Form | Cationicity | DS | Remark |
|---|---|---|---|---|---|
| Starch No. 4 | 200.000.000 g/mol Undegraded starch backbone | Potato starch powder with 97.5% actives | N-content of 3.2% | 0.57 | 400 kg batch product, soluble in cold water |

Commercial products listed in table 10 are used in the evaluation of before said invention products for comparison.

TABLE 10

| Polymer | MW | Form | Polymer chemistry |
|---|---|---|---|
| Raisamyl 50021 | 200 000 000 g/mol Undegraded starch backbone | Powder with 82% actives | Cationised potato starch with DS = 0.035 |
| Raisamyl 70041 | 200 000 000 g/mol Undegraded starch backbone | Powder with 82% actives | Cationised tapioca starch with DS = 0.043 |
| Raisamyl 70741 | 300 000 000 g/mol Crosslinked starch backbone | Powder with 88% actives | Cationised tapioca starch with DS = 0.043 |
| Percol 175 | Intrinsic viscosity above 9.0 dL/g. | Beads, 100% actives | A linear copolymer of acrylamide with methyl chloride quaternary ammonium salt of dimethylaminoethyl acrylate (80/20 wt./wt.) of intrinsic viscosity above 9.0 dL/g |
| Particol S1020 | Surface area >450 m$^2$/g | 15% by weight active silica (SiO$_2$) aq. Solution | Colloidal silica microparticle for retention and drainage |

Test Procedures

1. Preparation of Polymers

All starches and the colloidal silica S1020 are prepared as 0.5% aqueous solutions based on actives. Percol was prepared as 0.1% aqueous solution.

2. Paper Furnishes

Fine Paper Furnish (FPF)

This alkaline, cellulosic fine paper suspension comprises solids, which are made up of about 81 weight % fibre and about 19% precipitated calcium carbonate filler (PCC). The PCC used is "Albocar HO" from Specialty Minerals Lifford/UK. The employed fibre fraction is a 70/30 weight % blend of bleached birch and bleached pine, beaten to a Schopper Riegler freeness of 50° to provide enough fines for realistic testing conditions. The furnish is diluted with tap water to a consistency of about 0.49 weight %, comprising fines of about 29.1 weight %, which the constituents of fines are approximately 66.3% ash and 33.7% fibre fines. 5 kg/t (on total solids) cationic starch (Raisamyl 50021) with a DS value of 0.035 based on dry weight is added to the paper stock. The pH of the final mechanical furnish is 7.0±0.1, the conductivity about 430 μS/m and the zeta potential about −16.2 mV.

Mechanical Furnish (MF)

The mechanical furnish employed to conduct the examples may for instance be used to manufacture base paper for coated ground wood grades. It consists of 40% unbleached stone ground wood, 45% pine kraft pulp and 15% mineral filler. The mineral filler is an aqueous dispersion of precipitated calcium carbonate (PCC) from Specialty Minerals Lifford/UK (Albocar HO). The final stock has a consistency of 0.5% and conductivity of about 2000 μS/m. 5 kg/t (on total solids) cationic starch (Raisamyl 50021) with a DS value of 0.035 based on dry weight is added to the paper stock.

3. First Pass Total and Ash Retention

Paper sheets of 19 cm$^2$ were made with a moving belt former by using 400-500 mL of paper stock depending on furnish type and consistency. The sheets are weighed in order to determine first pass total and ash retention using the following formula:

$$FPTR\ [\%] = \text{Sheet weight [g]/Total amount of paper stock based on dry weight [g]} * 100$$

$$FPTAR\ [\%] = \text{Ash content in sheet [g]/total amount of paper stock ash based on dry weight [g]} * 100$$

First pass total retention, for simplicity often referred to as total retention, is directly related to the basis weight. Analogue first pass ash retention, for simplicity often referred to as ash retention, is relative to total retention directly related to the sheet ash content. This is representative of the filler retention. In order to demonstrate the invention by means of realistic paper sheet compositions, the effects of ash retention and total retention are displayed as sheet ash content in [%] and basis weight in [g/m$^2$].

The Moving Belt Former (MBF) from the Helsinki University of Technology simulates the wet end part of a conventional fourdrinier machine (single wire machine) in laboratory scale and is used to make hand sheets. The pulp slurry is formed on a fabric, which is exactly the same used in commercial paper and board machines. A moving perforated cogged belt produces the scraping effect and pulsation, simulating water removal elements, foils and vacuum boxes, located in the wire section. There is a vacuum box under the cogged belt. The vacuum level, belt speed and effective suction time and other operating parameters are controlled by a computer system. Typical pulsation frequency range is 50-100 Hz and effective suction time ranges from 0 to 500 ms. On top of the wire is a mixing chamber similar to the Britt Jar where the furnish is sheared with a speed controlled propeller before draining it to form a sheet. A detailed description of the MBF is given in "Advanced wire part simulation with a moving belt former and its applicability in scale up on rotogravure printing paper", Strengell, K., Stenbacka, U., Ala-Nikkola, J. in Pulp & Paper Canada 105 (3) (2004), T62-66. The simulator is also described in greater detail in "Laboratory testing of retention and drainage", p. 87 in Leo Neimo (ed.), Papermaking Science and Technology, Part 4, Paper Chemistry, Fapet Oy, Jyväskyla 1999.

The retention and drainage chemicals are dosed into this mixing chamber as outlined in the protocol below (see table 11).

TABLE 11

Moving Belt Former
Computer controlled test protocol

| Time [seconds] | Action |
|---|---|
| 0 | Start with stirrer set at 1500 rpm |
| 12 | Addition of polymer |
| 30 | Stirrer at 500 rpm; addition of polymer |
| 45 | Stirrer at 1500 rpm |
| 75 | Addition of polymer |
| 80 | Start drainage to from a sheet |

Figure 14:
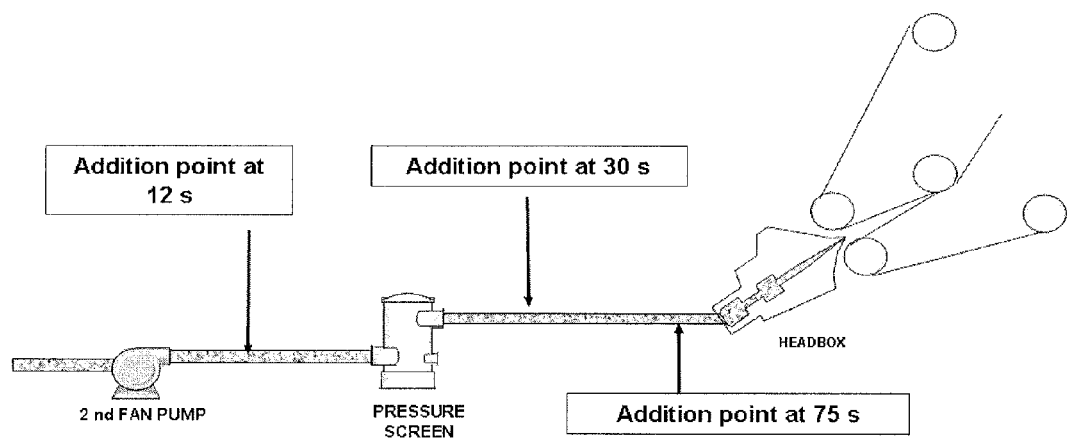
FIG. 14 depicts Paper machine headbox with approach piping system.

The addition of a polymeric retention aid will normally bring about flocculation of the suspended solids. Thus the different possible polymer addition times, namely 12, 30 and 75 seconds differ in the rate of mechanical shearing that is applied during the remaining running time of experiment (see table 11). So formed flocs at 12 seconds are for instance subjected to more mechanical shearing than flocs formed at 75 seconds running time of experiment. In reality the flocculated suspension may be passed through one or more shear stages. Typically such shear stages are shear stages that include mixing, pumping and cleaning stages, such as one of the fan pumps or centriscreens (see figure 14).

An addition time of 12 seconds may be referred to as chemical dosing before the pressure screen, whereas chemical dosing at 30 seconds may be referred to as an addition after the pressure screen. An addition time of 75 seconds is consequentially also referred to as an addition after the pressure screen but closer to the paper machine headbox as with dosing at 30 seconds (see figure 14). Thus the cellulosic suspension flocculated at 30 seconds is subjected to more mechanical shearing than the cellulosic suspension flocculated at 75 seconds (see figure 14).

4. Free/Initial Drainage

The drainage properties are determined using a modified Schopper-Riegler apparatus with the rear exit blocked so that the drainage water exits through the front opening. The drainage performance is displayed as drainage rate describing how many millilitres are released through the Schopper-Riegler wire per minute. The dosing sequence is the same as outlined for the Moving Belt Former experiments. The paper stock is drained after stirring it for 80 seconds in accordance to the MBF protocol.

5. Formation

The Formation is measured with a PTS DOMAS system by light transmission and expressed as "power spectrum formation index" and "PTS formation index". The "Power Spectrum" formation index is calculated from a frequency spectrum based on a Fast Fourier Transformation of the paper image. It provides information about most occurring floc sizes and gives tendencies towards print unevenness. Smaller indices indicate better formation.

The "PTS" formation is used to back up the "Power Spectrum" formation data in this document. It calculated by the analysis of the 2-dimensional grey value profile of the image. Greater variations in grey values indicate poor formation. Smaller indices indicate better formation. Further information about the PTS DOMAS system and therewith obtained formation indices can be found under www.domas.de or www.ptspaper.de.

TABLE 12

Summary of retention, drainage and formation data from different polymers in fine paper furnish dosed at 30 seconds:

| | Polymer | | | | | | | |
|---|---|---|---|---|---|---|---|---|
| Unit | Dosage [g/t] | Ash content [%] | Ash retention [%] | Total retention [%] | Drainage rate [mL/min] | Basis weight [g/m$^2$] | Power Spectrum Formation Index | PTS Formation Index |
| Blank | 0 | 1.5 | 6.1 | 68.8 | 452.5 | 51.6 | 1068.7 | 9.4 |
| PC175 (30 s) | 100 | 5.1 | 22.0 | 74.8 | 483.5 | 56.0 | 1194.8 | 9.9 |
| PC175 (30 s) | 200 | 7.4 | 33.3 | 78.3 | 464.4 | 58.7 | 1355.9 | 10.5 |
| PC175 (30 s) | 300 | 8.5 | 35.1 | 72.0 | 483.5 | 53.9 | 1499.4 | 11.2 |
| PC175 (30 s) | 400 | 9.7 | 43.0 | 76.9 | 497.1 | 57.6 | 1576.6 | 11.4 |
| Raisamyl 50021 (30 s) | 2000 | 5.4 | 23.6 | 75.5 | 653.6 | 56.6 | 1253.9 | 10.1 |
| Raisamyl 50021 (30 s) | 3000 | 6.4 | 31.3 | 84.4 | 678.7 | 63.3 | 1013.1 | 9.2 |
| Raisamyl 50021 (30 s) | 4000 | 7.8 | 39.5 | 88.5 | 678.7 | 66.3 | 981.1 | 9.2 |
| Raisamyl 50021 (30 s) | 5000 | 9.2 | 46.8 | 88.6 | 678.7 | 66.8 | 839.4 | 8.6 |
| Raisamyl 50021 (30 s) | 6000 | 11.2 | 59.8 | 93.1 | 692.0 | 69.8 | 850.7 | 8.6 |
| Raisamyl 70041 (30 s) | 2000 | 11.2 | 53.1 | 82.4 | 619.2 | 61.7 | 935.2 | 9.0 |
| Raisamyl 70041 (30 s) | 3000 | 10.4 | 55.6 | 93.2 | 653.6 | 69.9 | 767.8 | 8.4 |
| Raisamyl 70041 (30 s) | 4000 | 9.5 | 48.6 | 88.7 | 598.2 | 66.4 | 740.6 | 8.3 |
| Raisamyl 70041 (30 s) | 5000 | 9.1 | 42.5 | 81.0 | 692.0 | 60.7 | 902.2 | 9.5 |
| Raisamyl 70041 (30 s) | 6000 | 8.2 | 41.2 | 87.5 | 705.9 | 65.6 | 908.1 | 9.6 |
| Raisamyl 70741 (30 s) | 2000 | 6.0 | 27.7 | 80.2 | 678.7 | 60.1 | 1427.5 | 11.0 |
| Raisamyl 70741 (30 s) | 3000 | 7.9 | 38.7 | 84.7 | 720.3 | 63.4 | 1202.1 | 10.5 |
| Raisamyl 70741 (30 s) | 4000 | 8.6 | 43.2 | 87.2 | 720.3 | 65.3 | 1226.9 | 10.9 |
| Raisamyl 70741 (30 s) | 5000 | 9.6 | 49.0 | 89.2 | 720.3 | 66.8 | 1146.2 | 10.1 |
| Raisamyl 70741 (30 s) | 6000 | 11.0 | 60.0 | 95.1 | 678.7 | 71.3 | 1082.3 | 11.0 |
| Starch No. 1 (30 s) | 2000 | 10.3 | 52.6 | 89.1 | 653.6 | 66.7 | 573.0 | 6.8 |
| Starch No. 1 (30 s) | 3000 | 9.9 | 51.2 | 90.1 | 678.7 | 67.5 | 486.7 | 6.3 |
| Starch No. 1 (30 s) | 4000 | 9.5 | 49.9 | 91.3 | 735.3 | 68.4 | 480.2 | 6.3 |
| Starch No. 1 (30 s) | 5000 | 9.5 | 45.5 | 83.0 | 735.3 | 62.2 | 562.7 | 6.6 |

TABLE 12-continued

Summary of retention, drainage and formation data from different polymers in fine paper furnish dosed at 30 seconds:

| | Polymer | | | | | | |
|---|---|---|---|---|---|---|---|
| Unit | Dosage [g/t] | Ash content [%] | Ash retention [%] | Total retention [%] | Drainage rate [mL/min] | Basis weight [g/m$^2$] | Power Spectrum Formation Index | PTS Formation Index |
| Starch No. 1 (30 s) | 6000 | 8.2 | 39.5 | 83.6 | 784.3 | 62.6 | 608.2 | 6.6 |
| Starch No. 2 (30 s) | 2000 | 10.2 | 50.2 | 85.8 | 678.7 | 64.3 | 755.4 | 8.0 |
| Starch No. 2 (30 s) | 3000 | 9.8 | 50.7 | 90.0 | 692.0 | 67.4 | 593.9 | 7.5 |
| Starch No. 2 (30 s) | 4000 | 8.9 | 45.8 | 90.0 | 735.3 | 67.4 | 539.1 | 6.2 |
| Starch No. 2 (30 s) | 5000 | 9.6 | 43.8 | 79.7 | 735.3 | 59.7 | 591.6 | 7.0 |
| Starch No. 2 (30 s) | 6000 | 8.7 | 43.0 | 85.7 | 735.3 | 64.2 | 490.1 | 5.9 |
| Starch No. 3 (30 s) | 2000 | 8.9 | 44.8 | 87.3 | 665.9 | 65.4 | 735.6 | 7.4 |
| Starch No. 3 (30 s) | 3000 | 8.3 | 41.7 | 87.4 | 692.0 | 65.5 | 631.7 | 6.8 |
| Starch No. 3 (30 s) | 4000 | 8.3 | 38.8 | 81.8 | 678.7 | 61.3 | 685.5 | 7.3 |
| Starch No. 3 (30 s) | 5000 | 8.0 | 39.9 | 86.2 | 705.9 | 64.6 | 508.2 | 5.7 |
| Starch No. 3 (30 s) | 6000 | 7.7 | 35.6 | 80.8 | 705.9 | 60.5 | 580.6 | 6.4 |
| Starch No. 4 (30 s) | 2000 | 10.9 | 52.1 | 83.5 | 630.3 | 62.6 | 815.3 | 8.1 |
| Starch No. 4 (30 s) | 3000 | 10.1 | 50.1 | 86.8 | 653.6 | 65.0 | 607.1 | 7.1 |
| Starch No. 4 (30 s) | 4000 | 9.9 | 54.8 | 95.9 | 665.9 | 71.8 | 531.8 | 6.7 |
| Starch No. 4 (30 s) | 5000 | 9.9 | 51.4 | 90.0 | 678.7 | 67.4 | 499.3 | 5.6 |
| Starch No. 4 (30 s) | 6000 | 9.7 | 49.6 | 88.6 | 720.3 | 66.4 | 486.0 | 5.8 |

TABLE 13

Summary of retention, drainage and formation data from different polymers in fine paper furnish dosed at 75 seconds

| | Polymer | | | | | | |
|---|---|---|---|---|---|---|---|
| Unit | Dosage [g/t] | Ash content [%] | Ash retention [%] | Total retention [%] | Drainage rate [mL/min] | Basis weight [g/m2] | Power Spectrum Formation Index | PTS Formation Index |
| Raisamyl 50021 (75 s) | 500 | 3.3 | 15.3 | 81.1 | 678.7 | 60.8 | 1220.8 | 11.6 |
| Raisamyl 50021 (75 s) | 1000 | 4.0 | 18.5 | 81.1 | 665.9 | 60.8 | 1384.8 | 12.7 |
| Raisamyl 50021 (75 s) | 2000 | 5.4 | 26.4 | 84.7 | 705.9 | 63.4 | 1249.1 | 11.8 |
| Raisamyl 50021 (75 s) | 3000 | 8.7 | 44.6 | 88.9 | 692.0 | 66.6 | 1007.2 | 10.6 |
| Raisamyl 50021 (75 s) | 4000 | 8.5 | 43.2 | 88.1 | 692.0 | 66.0 | 1055.8 | 9.7 |
| Raisamyl 50021 (75 s) | 5000 | 10.1 | 51.5 | 88.7 | 705.9 | 66.4 | 954.7 | 9.7 |
| Raisamyl 70041 (75 s) | 500 | 9.22 | 45.79 | 86.47 | 619 | 64.8 | 972.1 | 9.32 |
| Raisamyl 70041 (75 s) | 1000 | 11.5 | 59.7 | 90.0 | 630.3 | 67.5 | 1160.7 | 10.1 |
| Raisamyl 70041 (75 s) | 2000 | 13.6 | 73.4 | 94.2 | 641.7 | 70.6 | 1015.5 | 11.6 |
| Raisamyl 70041 (75 s) | 3000 | 13.0 | 70.6 | 94.5 | 678.7 | 70.8 | 1078.9 | 11.9 |
| Raisamyl 70041 (75 s) | 4000 | 14.1 | 71.0 | 87.4 | 720.3 | 65.5 | 1289.8 | 13.2 |
| Raisamyl 70041 (75 s) | 5000 | 12.6 | 70.6 | 97.8 | 750.9 | 73.3 | 1201.9 | 13.1 |
| Raisamyl 70741 (75 s) | 500 | 2.4 | 11.0 | 78.2 | 653.6 | 58.6 | 1219.0 | 11.4 |
| Raisamyl 70741 (75 s) | 1000 | 3.7 | 15.8 | 74.9 | 665.9 | 56.1 | 1381.5 | 11.6 |
| Raisamyl 70741 (75 s) | 2000 | 5.1 | 22.5 | 77.5 | 665.9 | 58.0 | 1525.2 | 12.8 |
| Raisamyl 70741 (75 s) | 3000 | 7.1 | 32.5 | 80.0 | 678.7 | 59.9 | 1713.0 | 12.7 |
| Raisamyl 70741 (75 s) | 4000 | 9.1 | 46.9 | 89.7 | 692.0 | 67.2 | 1726.3 | 11.1 |
| Raisamyl 70741 (75 s) | 5000 | 9.7 | 47.0 | 84.5 | 692.0 | 63.3 | 1696.0 | 13.7 |
| Starch No. 1 (75 s) | 500 | 9.5 | 45.3 | 83.4 | 665.9 | 62.5 | 953.0 | 8.9 |
| Starch No. 1 (75 s) | 1000 | 11.4 | 58.7 | 90.0 | 678.7 | 67.4 | 830.8 | 9.6 |
| Starch No. 1 (75 s) | 2000 | 12.6 | 65.8 | 90.9 | 720.3 | 68.1 | 773.2 | 9.3 |
| Starch No. 1 (75 s) | 3000 | 12.1 | 61.8 | 88.7 | 767.3 | 66.4 | 705.6 | 8.2 |
| Starch No. 1 (75 s) | 4000 | 12.1 | 62.3 | 89.9 | 784.3 | 67.3 | 816.3 | 8.6 |
| Starch No. 1 (75 s) | 5000 | 12.3 | 64.4 | 91.3 | 840.3 | 68.4 | 686.5 | 8.1 |
| Starch No. 2 (75 s) | 500 | 9.5 | 45.3 | 82.9 | 619.2 | 62.1 | 961.7 | 9.2 |
| Starch No. 2 (75 s) | 1000 | 9.5 | 49.1 | 89.9 | 653.6 | 67.4 | 972.8 | 9.6 |
| Starch No. 2 (75 s) | 2000 | 10.8 | 54.5 | 87.6 | 678.7 | 65.7 | 888.2 | 9.7 |
| Starch No. 2 (75 s) | 3000 | 11.0 | 61.0 | 96.0 | 705.9 | 72.0 | 722.1 | 8.7 |
| Starch No. 2 (75 s) | 4000 | 11.5 | 58.1 | 87.7 | 750.9 | 65.7 | 608.0 | 7.6 |
| Starch No. 2 (75 s) | 5000 | 11.0 | 58.4 | 92.0 | 767.3 | 68.9 | 639.9 | 8.4 |
| Starch No. 3 (75 s) | 500 | 8.1 | 39.4 | 84.2 | 619.2 | 63.1 | 1181.9 | 10.0 |
| Starch No. 3 (75 s) | 1000 | 9.9 | 48.1 | 84.6 | 630.3 | 63.4 | 991.1 | 9.3 |
| Starch No. 3 (75 s) | 2000 | 10.2 | 52.0 | 88.5 | 665.9 | 66.6 | 837.4 | 9.6 |
| Starch No. 3 (75 s) | 3000 | 10.7 | 53.1 | 86.8 | 678.7 | 65.0 | 665.9 | 7.7 |
| Starch No. 3 (75 s) | 4000 | 10.3 | 50.4 | 85.3 | 705.9 | 63.9 | 632.2 | 7.4 |
| Starch No. 3 (75 s) | 5000 | 9.5 | 47.8 | 87.9 | 705.9 | 65.9 | 592.5 | 7.3 |
| Starch No. 4 (75 s) | 500 | 8.5 | 40.6 | 83.4 | 692.0 | 62.5 | 1135.4 | 10.0 |
| Starch No. 4 (75 s) | 1000 | 10.6 | 51.1 | 83.6 | 665.9 | 62.6 | 1013.4 | 9.6 |

TABLE 13-continued

Summary of retention, drainage and formation data from different polymers in fine paper furnish dosed at 75 seconds

| Unit | Polymer | | | | | | | |
|---|---|---|---|---|---|---|---|---|
| | Dosage [g/t] | Ash content [%] | Ash retention [%] | Total retention [%] | Drainage rate [mL/min] | Basis weight [g/m2] | Power Spectrum Formation Index | PTS Formation Index |
| Starch No. 4 (75 s) | 2000 | 11.8 | 61.8 | 90.8 | 678.7 | 68.0 | 748.4 | 9.2 |
| Starch No. 4 (75 s) | 3000 | 11.7 | 64.1 | 95.7 | 705.9 | 71.7 | 686.0 | 8.3 |
| Starch No. 4 (75 s) | 4000 | 11.6 | 62.1 | 93.3 | 735.3 | 69.9 | 663.0 | 8.2 |
| Starch No. 4 (75 s) | 5000 | 12.2 | 64.1 | 91.7 | 767.3 | 68.7 | 686.3 | 8.5 |

TABLE 14

Summary of retention, drainage and formation data from single polymer systems in mechanical furnish

| Unit | Polymer | | | | | |
|---|---|---|---|---|---|---|
| | Total retention [%] | Basis weight [g/m²] | Ash retention [%] | Ash content [%] | Power spectrum Formation index | Drainage rate [ml/min] |
| Blank | 88.5 | 81.9 | 49.0 | 8.0 | 251.5 | 153.8 |
| 100 g/t PC175 (30 s) | 90.4 | 83.7 | 59.3 | 9.5 | 278.4 | 169.8 |
| 200 g/t PC175 (30 s) | 90.1 | 83.4 | 64.8 | 10.4 | 302.2 | 176.5 |
| 300 g/t PC175 (30 s) | 93.2 | 86.2 | 70.4 | 10.9 | 251.4 | 185.6 |
| 400 g/t PC175 (30 s) | 93.7 | 86.8 | 71.1 | 10.9 | 301.4 | 191.5 |
| 1000 g/t starch No. 4 (30 s) | 89.1 | 82.5 | 58.7 | 9.5 | 264.6 | 178.2 |
| 2000 g/t starch No. 4 (30 s) | 92.7 | 85.8 | 63.8 | 9.9 | 232.2 | 176.5 |
| 3000 g/t starch No. 4 (30 s) | 90.1 | 83.4 | 62.6 | 10.0 | 272.5 | 181.8 |
| 4000 g/t starch No. 4 (30 s) | 91.0 | 84.3 | 64.4 | 10.2 | 234.9 | 191.5 |
| 5000 g/t starch No. 4 (30 s) | 92.7 | 85.8 | 63.3 | 9.8 | 206.3 | 185.6 |

TABLE 15

Summary of retention and formation data from dual polymer systems in mechanical furnish

| Unit | Polymer | | | | |
|---|---|---|---|---|---|
| | Total retention [%] | Basis weight [g/m²] | Ash retention [%] | Ash content [%] | Power spectrum Formation index |
| 100 g/t PC175 (12 s) + 3000 g/t S1020 (30 s) | 93.5 | 86.6 | 60.4 | 9.3 | 203.1 |
| 200 g/t PC175 (12 s) + 3000 g/t S1020 (30 s) | 94.4 | 87.4 | 68.9 | 10.5 | 182.0 |
| 400 g/t PC175 (12 s) + 3000 g/t S1020 (30 s) | 98.3 | 91.0 | 79.6 | 11.7 | 159.1 |
| 250 g/t starch No. 4 (12 s) + 3000 g/t S1020 (30 s) | 93.6 | 86.6 | 48.1 | 7.4 | 189.2 |
| 2000 g/t starch No. 4 (12 s) + 3000 g/t S1020 (30 s) | 95.5 | 88.4 | 62.8 | 9.5 | 174.9 |
| 4000 g/t starch No. 4 (12 s) + 3000 g/t S1020 (30 s) | 98.6 | 91.2 | 72.9 | 10.7 | 146.5 |
| 5000 g/t starch No. 4 (12 s) + 3000 g/t S1020 (30 s) | 98.7 | 91.4 | 75.2 | 11.0 | 126.9 |
| 1000 g/t 50021 (12 s) + 3000 g/t S1020 (30 s) | 92.1 | 85.3 | 46.6 | 7.3 | 217.8 |
| 2000 g/t 50021(12 s) + 3000 g/t S1020 (30 s) | 92.9 | 86.0 | 48.2 | 7.5 | 222.5 |
| 3000 g/t 50021 (12 s) + 3000 g/t S1020 (30 s) | 94.5 | 87.5 | 48.8 | 7.4 | 173.9 |
| 4000 g/t 50021(12 s) + 3000 g/t S1020 (30 s) | 92.9 | 86.0 | 52.0 | 8.1 | 212.0 |
| 5000 g/t 50021 (12 s) + 3000 g/t S1020 (30 s) | 94.8 | 87.7 | 51.4 | 7.8 | 191.4 |

Example 6 I

Application Window of Different Polymers in FPF

Figure 1B:
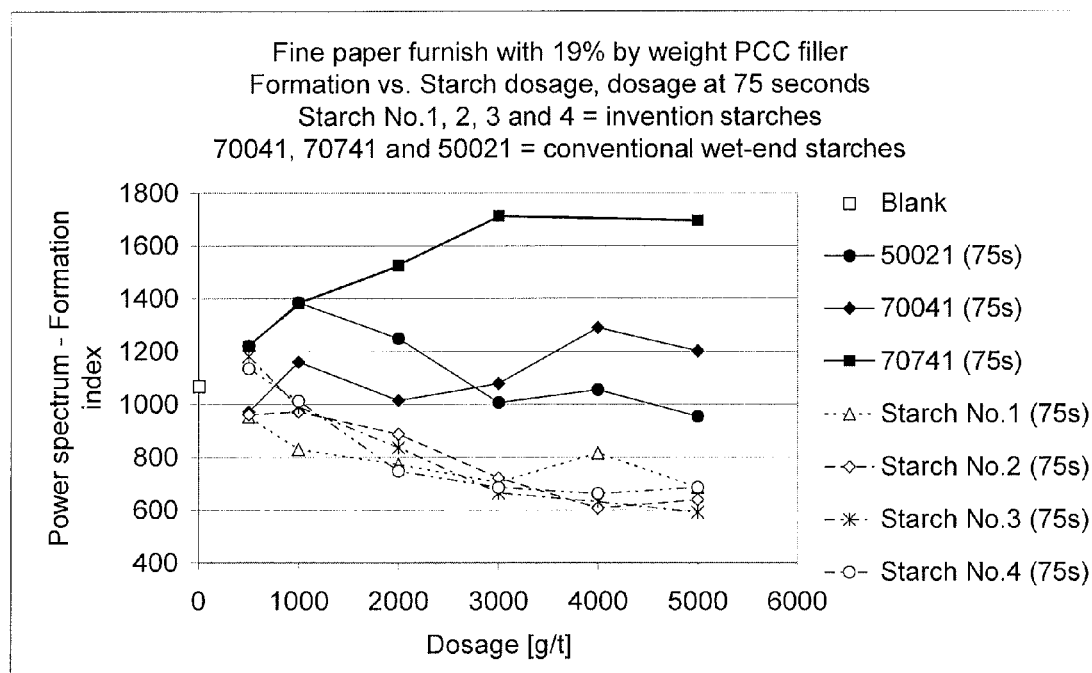
FIG. 1B depicts the application window of different polymeric retention aids in terms of formation vs. dosage. The Figure displays formation as response to chemical dosing at 75 seconds running time of experiment.

This example describes the application window of different polymeric retention aids in terms of formation vs. dosage by means of FIGS. 1A and 1B. Both graphs display the Power Spectrum formation index over polymer dosage. FIG. 1A shows the formation as response to chemical dosage at 30 seconds running time of experiment (see chapter "Moving Belt Former"), which is referred to as an addition after the pressure screen. FIG. 1B displays formation as response to chemical dosing at 75 seconds running time of experiment, which is also referred to as an addition after the pressure screen but closer to the paper machine headbox as with dosing at 30 seconds. Thus the cellulosic suspension flocculated at 30 seconds is subjected to more mechanical shearing than the cellulosic suspension flocculated at 75 seconds. It should be noted that the formation index improves with increasing basis weight. Strong flocculation with retention and drainage aids may outbalance this effect. It appears that Percol 175, a conventional high molecular weight retention aid on polyacrylamide basis deteriorates formation with increasing dosage (see FIG. 1A ). This effect is characteristic for high molecular weight retention aids and it is therefore difficult to obtain an optimum balance between retention, drainage and formation. In contrast, the use of starches leads to a comparatively moderate flocculation and therefore to a more favourable formation profile versus dosage and to a broader application window (see FIG. 1A). The improved formation profiles are attributed to a minor flocculation of the cellulosic suspension, which also requires in general higher polymer dosages to obtain the desired retention level (see FIG. 1A and table 12). Nevertheless all invention starches, regardless of their molecular weight, show a better formation profile in comparison to conventional wet-end starches (see FIG. 1A).

The forward displacement of the dosage point closer to the headbox improves the chemical effectiveness since the resultant flocs are subjected to less mechanical shearing (see tables 12 and 13). FIG. 1B shows that the invention starches provide better formation profiles than the conventional wet-end starches. Surprisingly also the crosslinked starches No. 2 and 3 give better formation values than Raisamyl 70741, a commercial high molecular weight, crosslinked retention starch. In fact Raisamyl 70741 behaves likewise Percol 175 when dosed at 75 seconds. From this it follows that all tested invention starches, regardless of their molecular weight, provide a broader application window regarding formation and dosage than state of the art commercial cationic starches.

Example 6 II

Raisamyl 50021 vs. Starches No. 1 and 4, Dosed at 30 s in FPF

Figure 2:
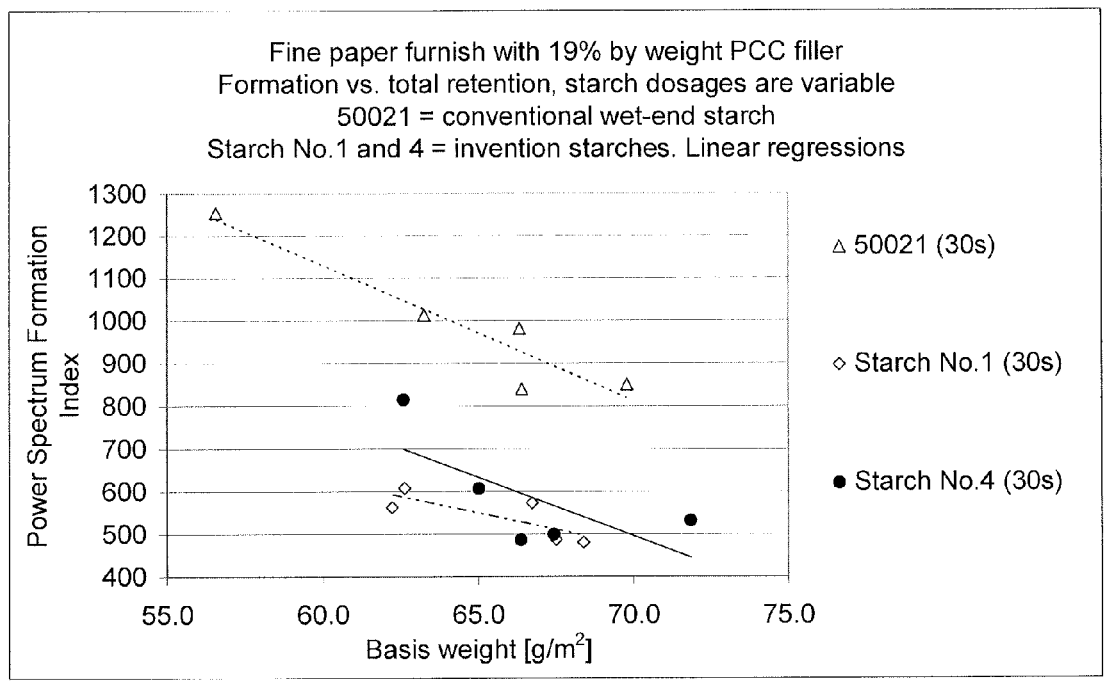
FIG. 2 compares Raisamyl 50021 vs. starches No. 1 and 4, dosed at 30s in fine paper furnish ("FPF").

This example demonstrates the superior formation properties of invention starches No. 1 and 4 (DS=0.82 and 0.57) in a fine paper furnish by comparison to a standard wet-end potato starch with similar molecular weight and a DS of about 0.035. FIG. 2 displays the Power Spectrum formation index over basis weight with lower index values indicating better formation. For a 65 g/m² sheet, the formation index improves by about 32%, from about 950 to about 650 using the invention products. The PTS formation index, representing the two-dimensional grey value variations in the sheet, is likewise improved. We also find that the novel starches significantly improve ash and total retention based on polymer dosage (see table 12).

Example 6 III

Raisamyl 70041 vs. Starches No. 1 and 4, Dosed at 30 s in FPF

Figure 3:
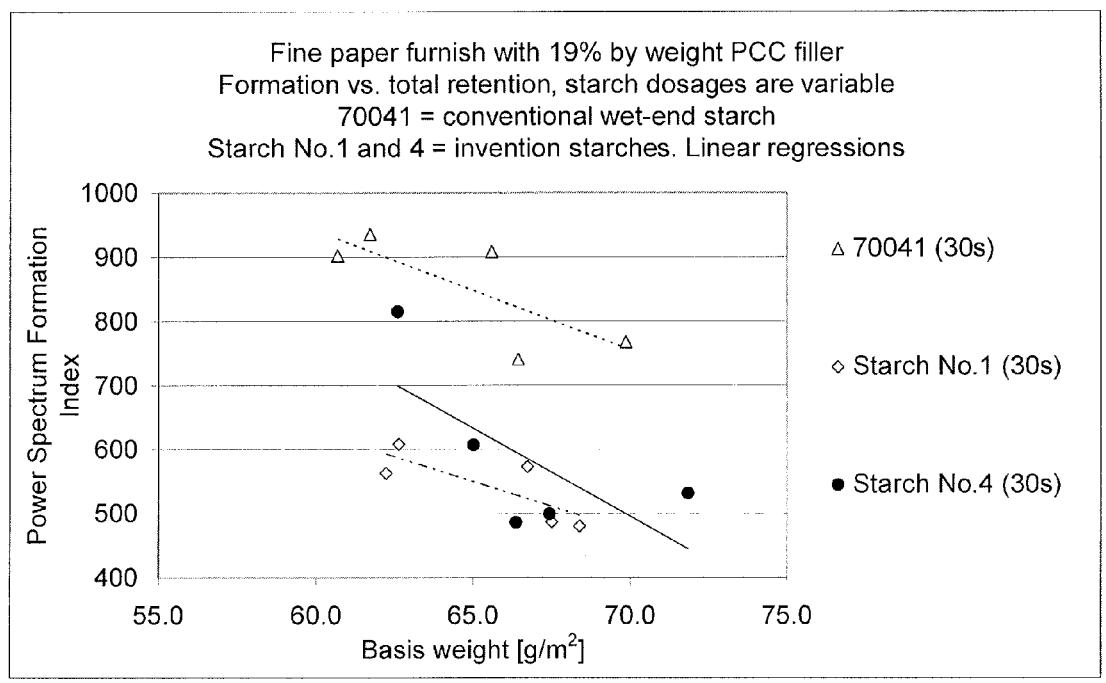
FIG. 3 compares Raisamyl 70041 vs. starches No. 1 and 4, dosed at 30s in FPF.

FIG. 3 demonstrates the superior formation properties of invention starches No. 1 and 4 (DS=0.82 and 0.57) in a fine paper furnish in comparison to a standard wet-end tapioca starch with similar molecular weight and a DS of about 0.043. Power Spectrum formation is improved by about 24 to 35% using the novel starches. The PTS formation index is also notably improved (see table 12). As already shown in example II, ash and total retention based on polymer dosage is notably enhanced with the invention products (see table 12).

Example 6 IV

Crosslinked HMW[1] Starches Dosed at 30 s in FPF

Figure 4:
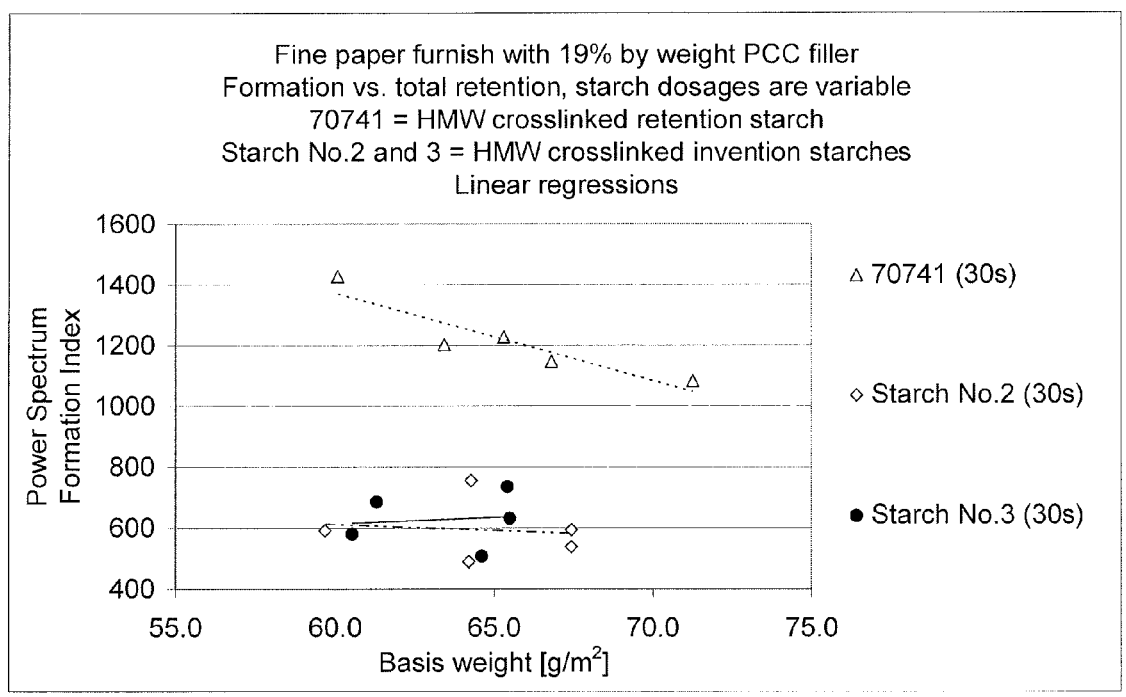
FIG. 4 depicts crosslinked HMW starches dosed at 30s in FPF made in accordance with the disclosed process. HMW=high molecular weight.

Raisamyl 70741, a high molecular weight crosslinked tapioca starch is compared with the crosslinked, high molecular weight starches No. 2 and 3 made in accordance with the invention process. It becomes apparent from FIG. 4 that the crosslinked invention starches clearly outperform Raisamyl 70741 in terms of formation. This fact is also reflected in the PTS formation values (see table 12).

[1]HMW=High molecular weight

Example 6 V

Raisamyl 50021 vs. Starches No. 1 and 4, Dosed at 75 s in FPF

Figure 5:
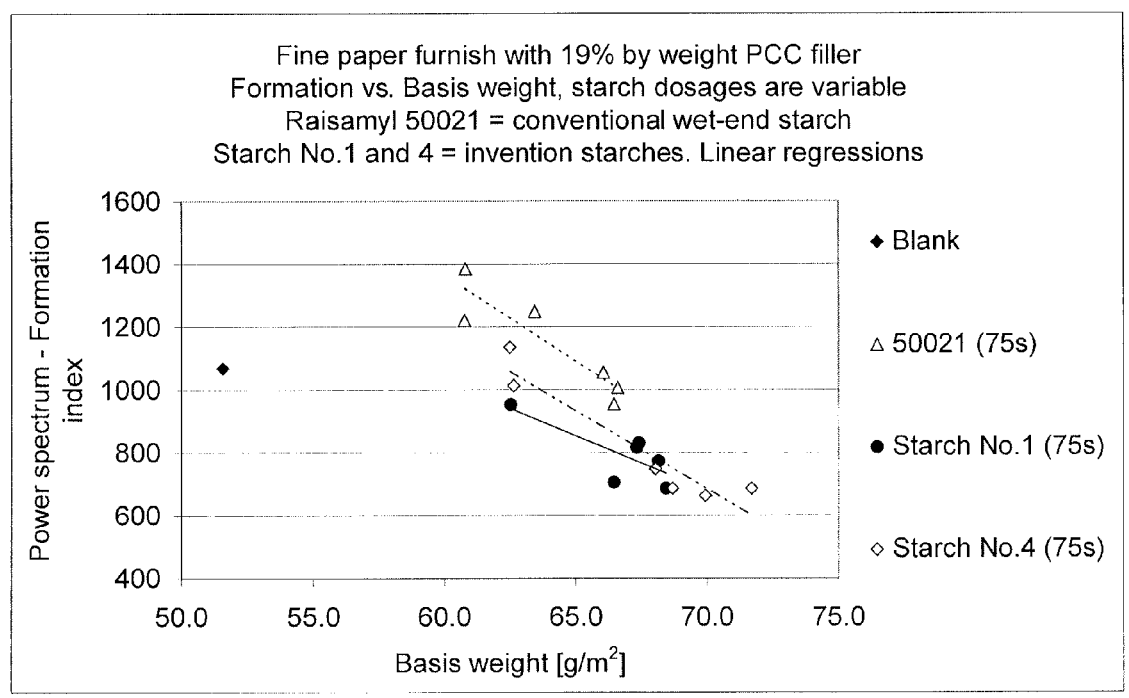
FIG. 5 compares Raisamyl 50021 vs. starches No. 1 and 4, dosed at 75s in FPF.

FIG. 5 displays the Power Spectrum formation index against basis weight for the commercial starch Raisamyl 50021 (DS of 0.035) and the high cationic starches No. 1 and 4 with a DS of about 0.82 and 0.57. All starches have approximately the same molecular weight and are dosed at 75 seconds running time of experiment. It becomes apparent that the novel starches provide improved formation in proportion to basis weight by comparison with Raisamyl 50021. The PTS formation index confirms the aforesaid findings (see table 13). Moreover starches No. 1 and 4 show an improve ash and total retention based on active dose (see table 13 and FIG. 5).

Example 6 VI

Raisamyl 70041 vs. Starches No. 1 and 4, Dosed at 75 s in FPF

Figure 6A:
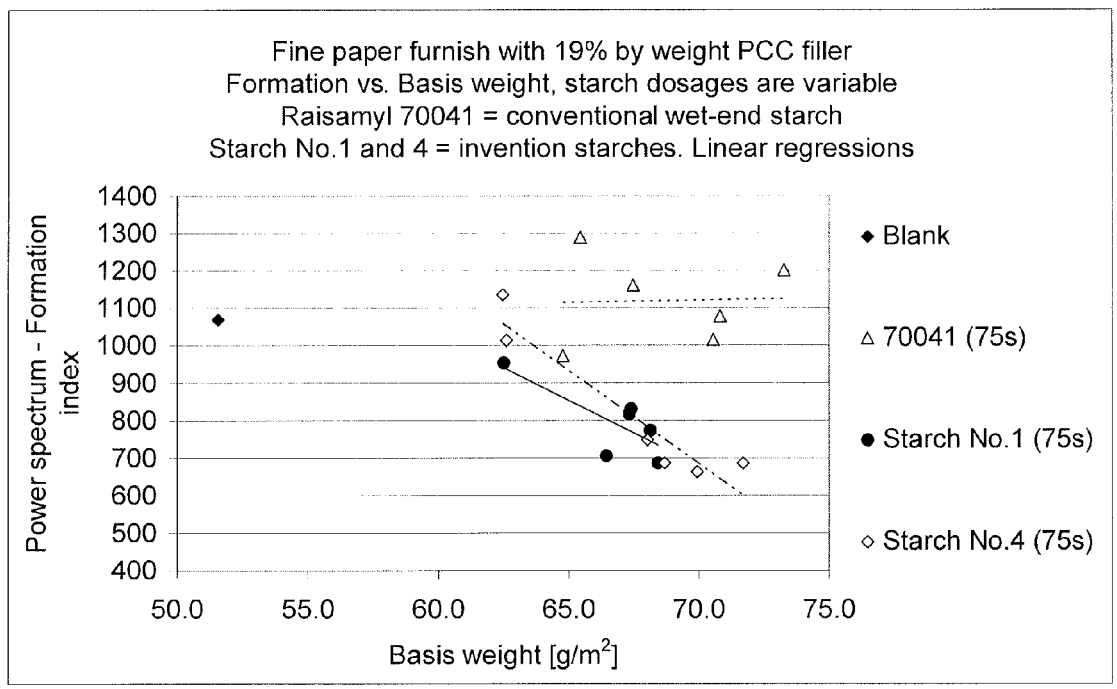
FIG. 6A compares Raisamyl 70041 vs. starches No. 1 and 4, dosed at 75s FPF, in terms of formation vs. basis weight.
Figure 6B:
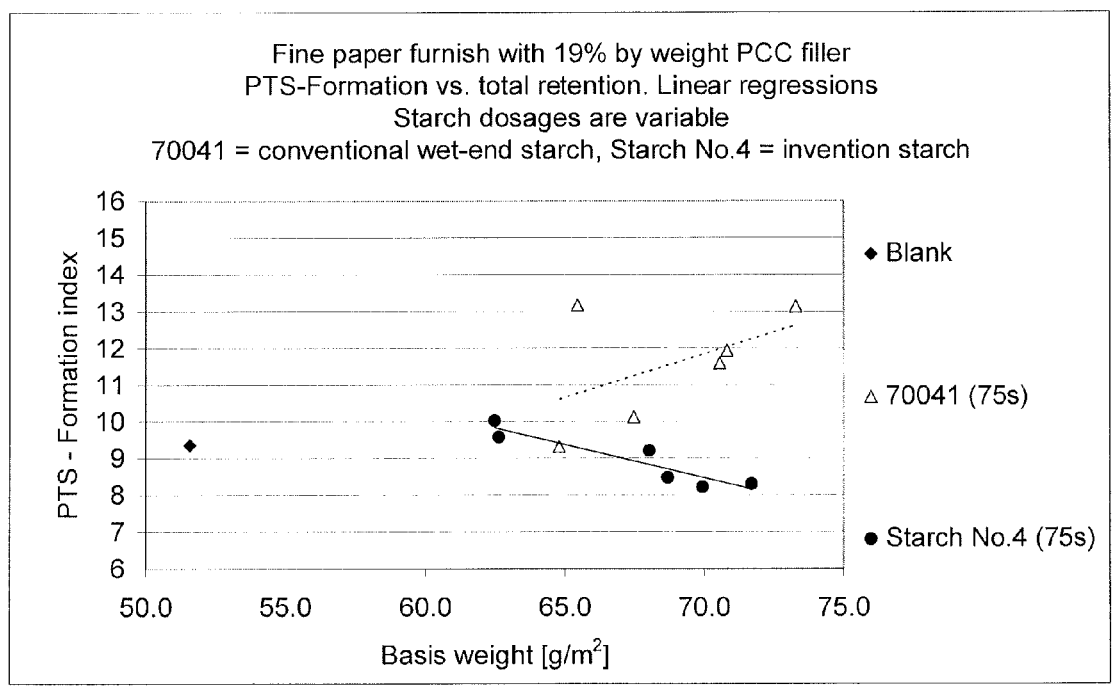
FIG. 6B compares Raisamyl 70041 vs. starches No. 1 and 4, dosed at 75s in FPF, in terms of PTS-formation vs. total retention.
Figure 6C:
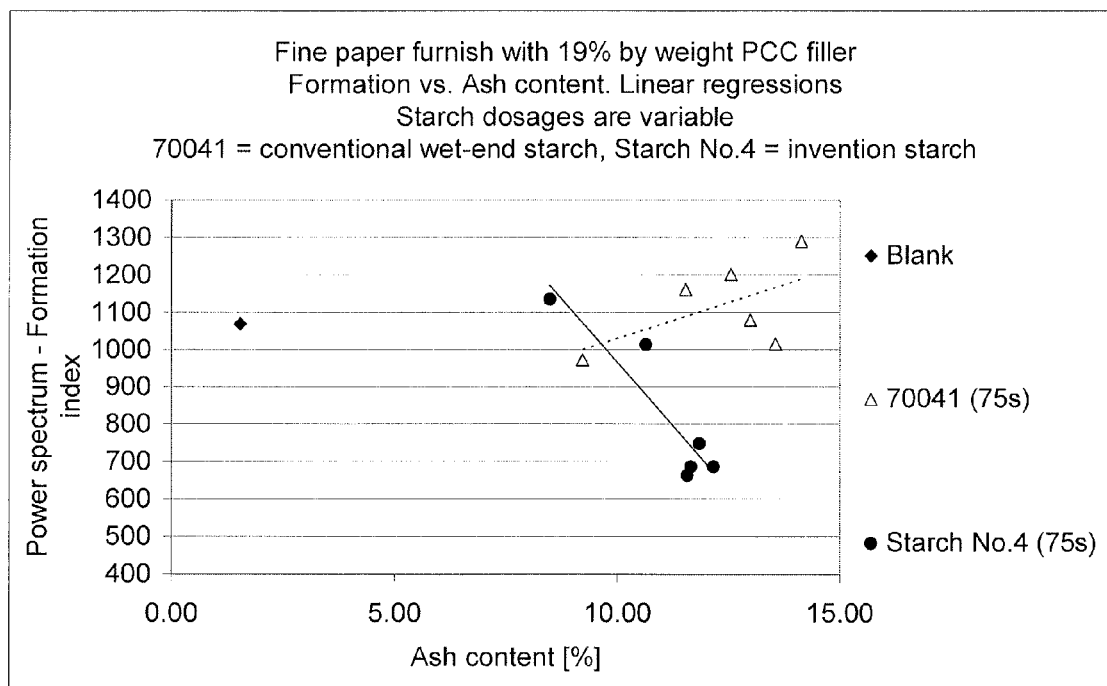
FIG. 6C compares Raisamyl 70041 vs. starches No. 1 and 4, dosed at 75s FPF, in terms of formation vs. ash content.

In FIG. 6A Raisamyl 70041, a commercial cationic tapioca starch with a DS of about 0.043 is compared with the invention starches No. 1 and 4. All starches have a comparable molecular weight and are added to the fine paper furnish at 75 seconds running time of experiment. The high cationic starches provide better formation relative to basis weight and this in particular for dosages above 500 g/t active material (FIG. 6A). The formation improvement for a 70 g/m² sheets amounts to about 35%, with a Power Spectrum Index amendment from about 1100 for Raisamyl 70041 to about 700 for starch No. 4 (see FIG. 6A and table 13). Similar results are obtained for starch No. 4 regarding "Power Spectrum formation index vs. ash content" and "PTS formation index vs. basis weight" (see FIGS. 6B and 6C).

Example 6 VII

Raisamyl 70041 vs. Starch No. 3 Dosed at 75 s in FPF

Figure 7:
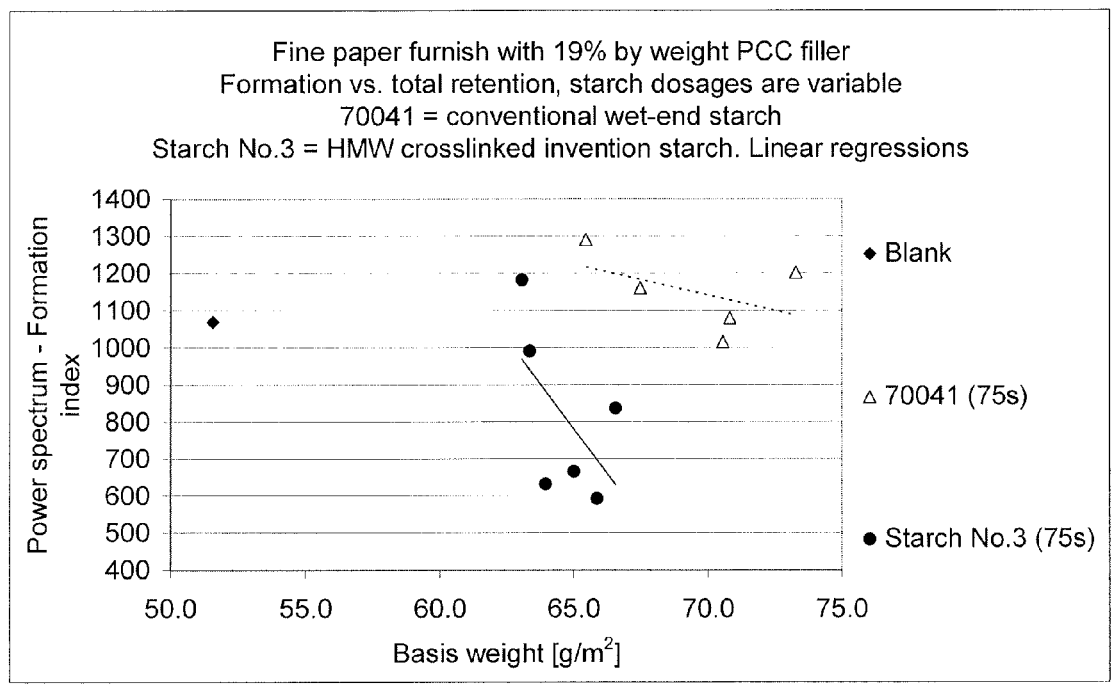
FIG. 7 compares Raisamyl 70041 vs. starch No. 3 in FPF, in terms of formation vs.total retention.

The purpose of this example is to demonstrate that even the high molecular weight crosslinked starch No. 3 unexpectedly outperforms the commercial starch Raisamyl 70041 formation-wise (see FIG. 7 and table 13). This evidence is comparably reflected by the PTS formation indices given in table 13. Better formation usually relates into better paper quality, such as opacity and printability.

Example 6 VIII

Crosslinked HMW Starches Dosed at 75 s in FPF

Figure 8:
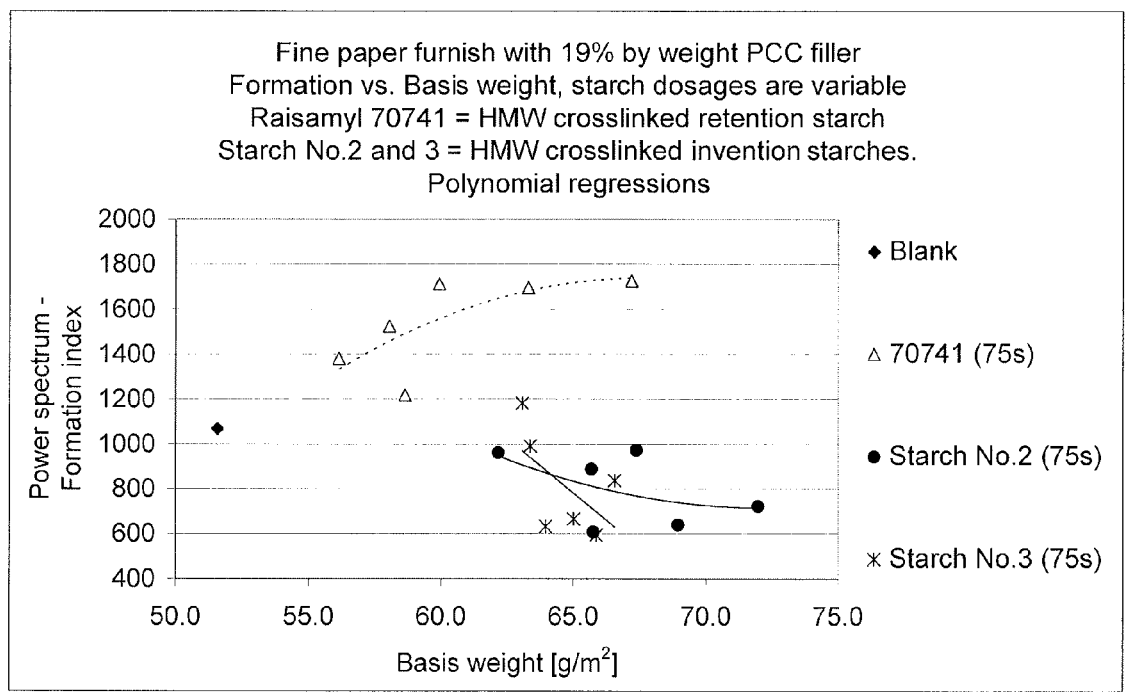
FIG. 8 compares crosslinked HMW starches dosed at 75s in FPF, in terms of formation vs. basis weight.

The crosslinked high molecular weight starches No. 2 and No. 3, made in accordance to the present process, are compared with the commercial available high molecular weight crosslinked starch Raisamyl 70741 in FIG. 8. It appears that both invention products clearly outperform Raisamyl 70741 in terms of formation relative to basis weight. Moreover starch No. 2 drastically improves retention based on active dose (see table 13).

Example 6 IX

Percol 175 vs. Invention Starches in FPF

Figure 9A:
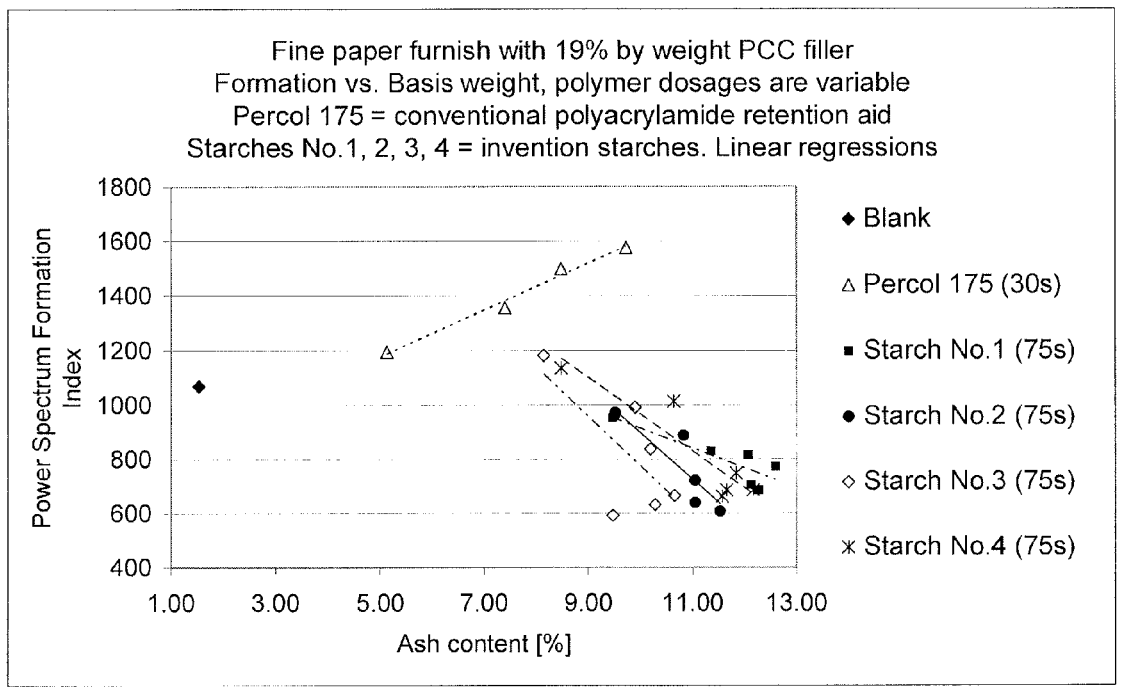
FIG. 9A compares Percol 175 vs. invention starches in FPF, in terms of formation vs. basis weight.
Figure 9B:
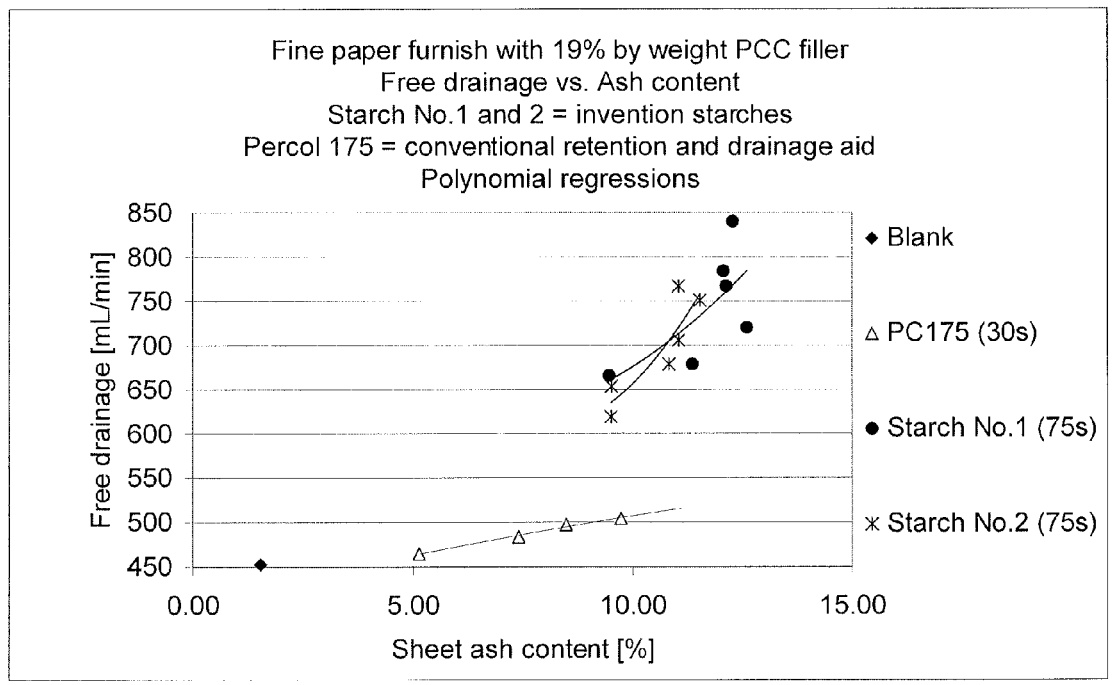
FIG. 9B compares Percol 175 vs. invention starches in FPF, in terms of free drainage vs. ash content.

Example IX demonstrates a process of making fine paper using the invention starches with an optimized dosing point by comparison to a conventional, high molecular weight polyacrylamide retention aid. We find that the invention starches effectively improve formation and retention when used in this regard (see FIG. 9 and table 13). This brings about significant commercial and quality advantages since the required starch dose is reduced and paper quality is improved. Furthermore this forward displacement causes superior drainage characteristics over the conventional polyacrylamide system (see FIG. 9B and table 13). Improved drainage is particularly useful for the production of higher basis weights to improve machine speed and productivity.

Example 6 X

Raisamyl 50021 at 30 s vs. Starch No. 4 at 30 s and 75 s in FPF

Figure 10:
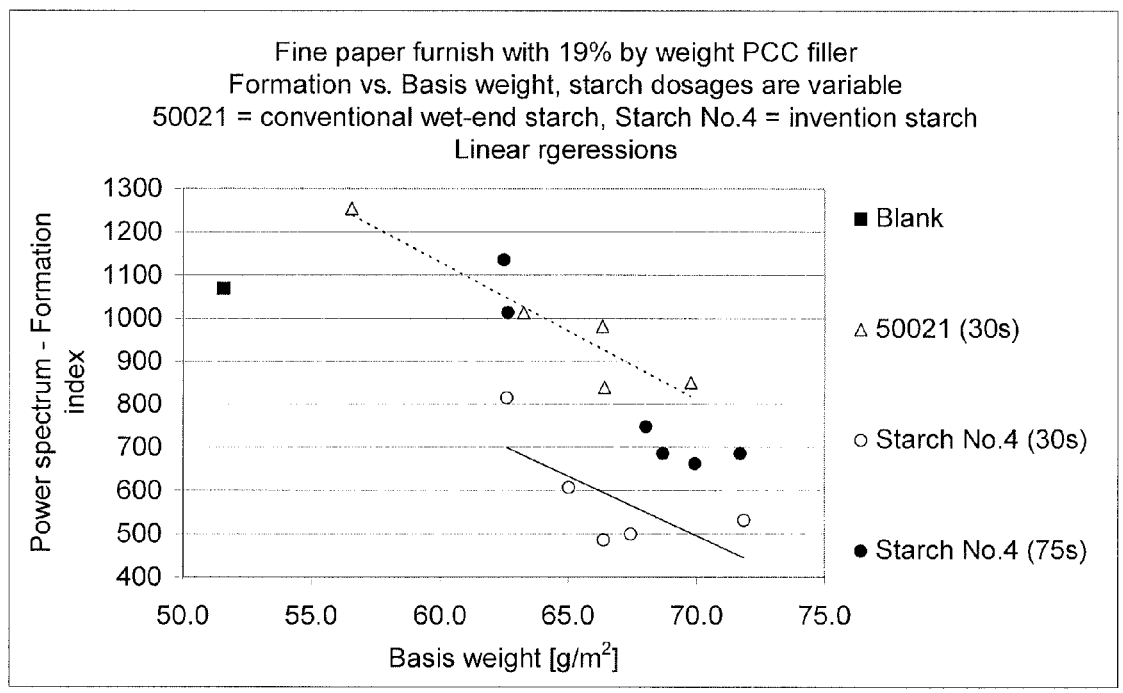
FIG. 10 compares Raisamyl 50021 at 30s vs. starch No. 4 at 30s and 75s in FPF, in terms of formation vs. basis weight.

This example shows that the competitive edge of the novel starches in terms of formation can be used to move the dosing point closer to the headbox without loosing formation in comparison to standard wet-end starches. FIG. 10 demonstrates that starch No. 4 dosed at 75 s provides equal or slightly better formation properties than Raisamyl 50021. This has the benefit of better balancing commercial (dosage) and quality (formation) aspects within the retention and drainage concept.

Example 6 XI

Raisamyl 70741 at 30 s vs. Starches No. 1 and 2 at 75 s in FPF

Figure 11A:
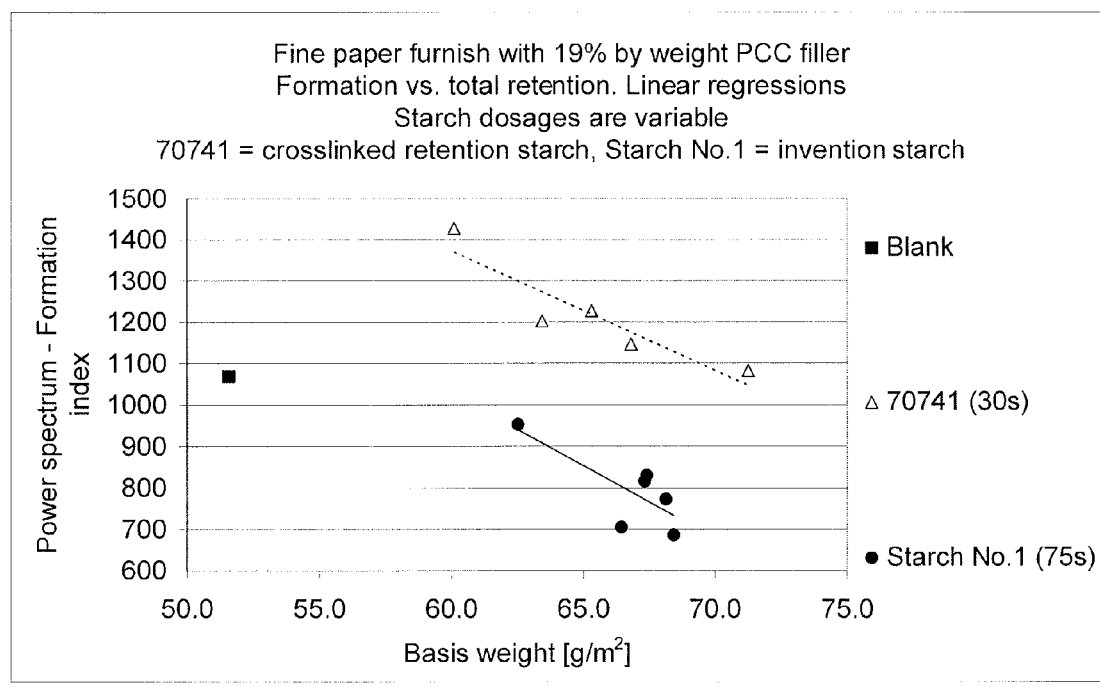
FIG. 11A compares Raisamyl 70741 at 30s vs. starches No. 1 at 75s in FPF, in terms of formation vs. total retention.

With this example we demonstrate that the dosing point can be moved closer to the headbox by using the novel starches without overflocculating the paper stock and compromising formation. FIG. 11A illustrates this opportunity by means of starch No. 1 and Raisamyl 70741, a high molecular weight retention starch. It appears that formation is still even better with starch No. 1 than with Raisamyl 70741.

Figure 11B:
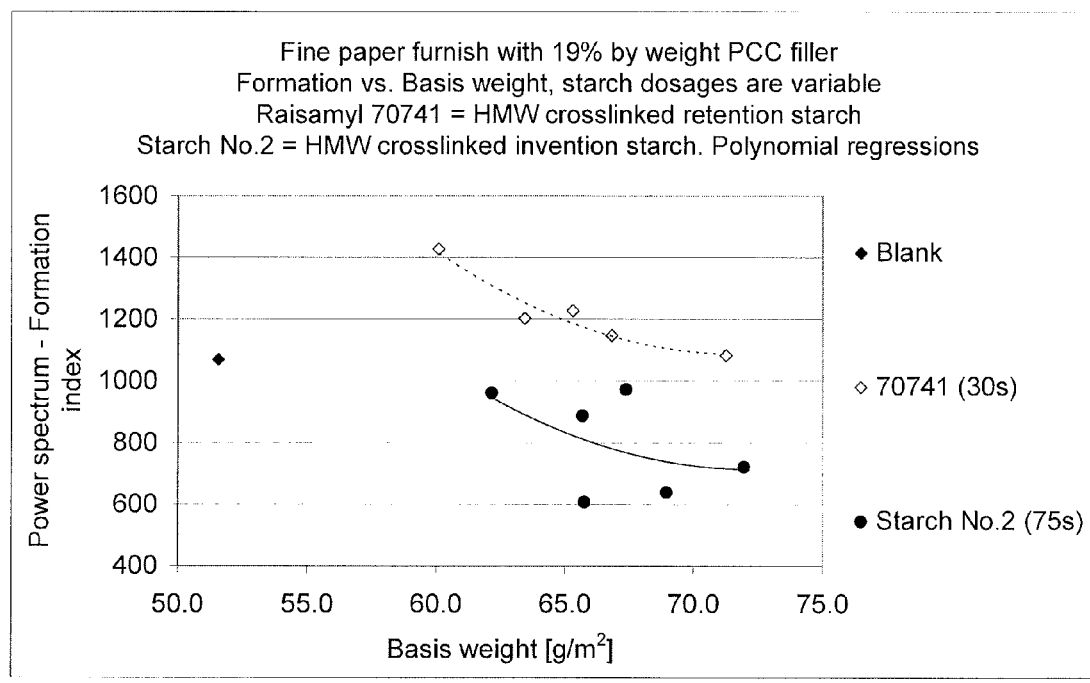
FIG. 11B compares Raisamyl 70741 at 30s vs. starches No. 2 at 75s in FPF, in terms of formation vs. basis weight.

FIG. 11B underlines this finding by showing that the crosslinked, high molecular weight invention starch No. 2 when dosed at 75 s provides still better formation than the commercial high molecular weight retention starch Raisamyl 70741 (see also table 13). As already stated in example X, this has the benefit of allowing the dosage to be reduced without compromising formation and paper quality.

Example 6 XII

Percol 175 vs. Starch No. 4 in Mechanical Furnish

Figure 12:
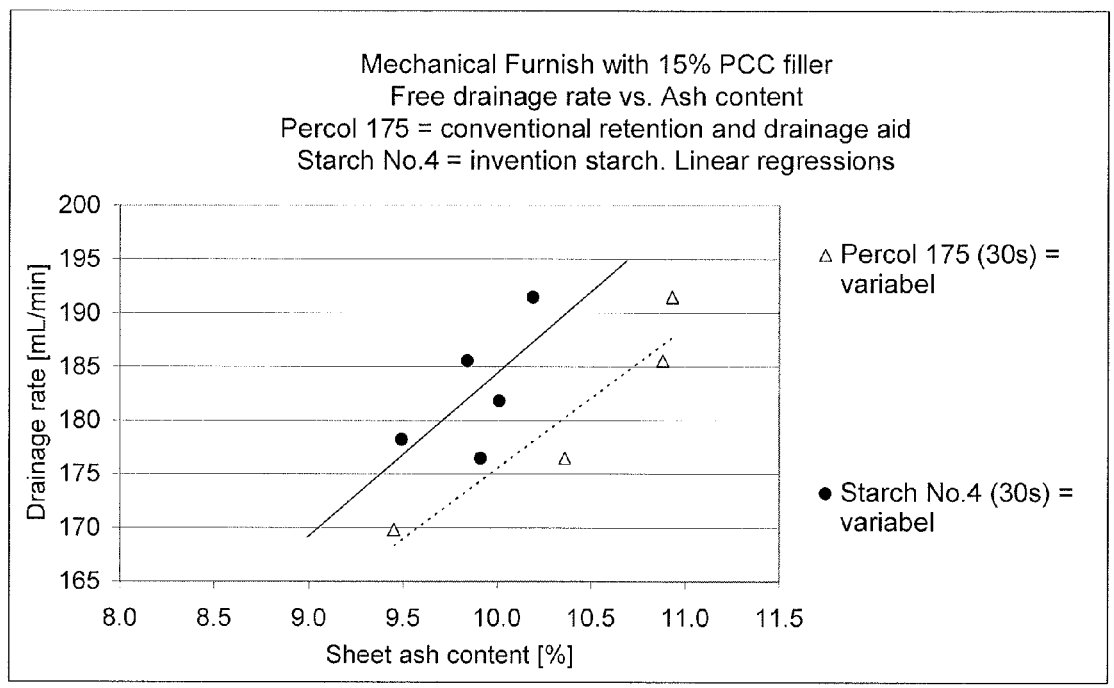
FIG. 12 compares Percol 175 vs. starch No. 4 in mechanical furnish, in terms of free drainage rate vs. ash content.

This example proves that the high cationic starches of the present process also function in mechanical furnishes, often referred to as wood- or lignin containing cellulosic suspensions. FIG. 12 displays that starch No. 4 provides a higher drainage rate relative to ash retention, respectively sheet ash content than Percol 175, a commercial retention aid on polyacrylamide basis. Higher free drainage rates are particularly important for the production of higher basis weights and may enable higher paper machine productivity through higher machine speeds and steam savings.

Example 6 XIII

Figure 13:
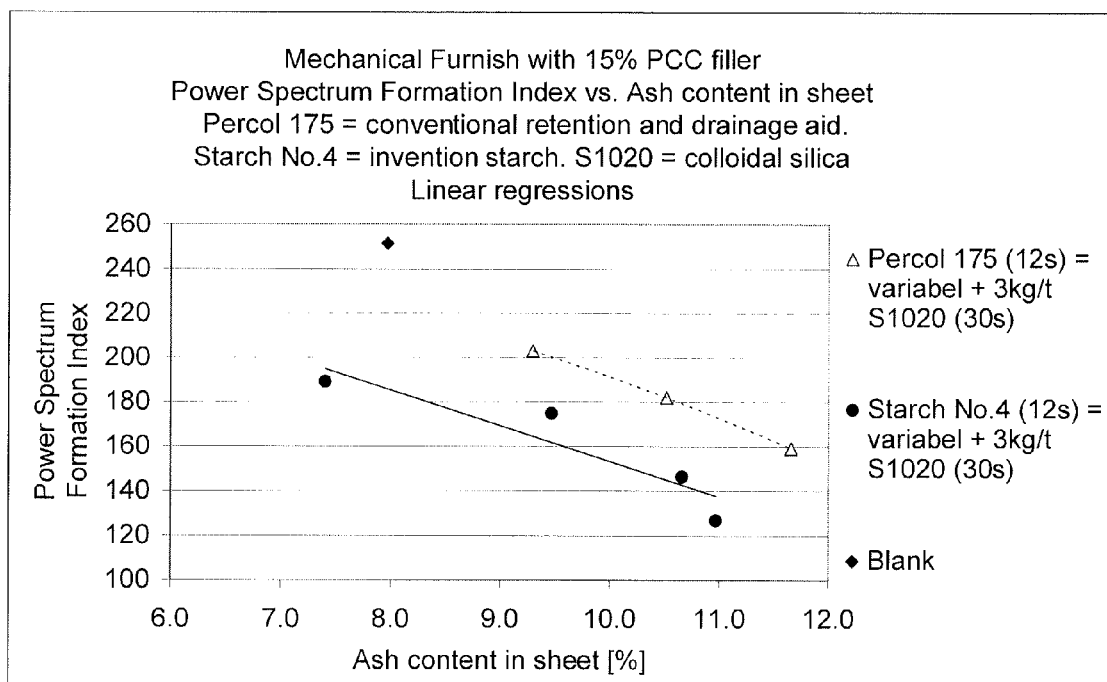
FIG. 13 depicts Percol 175 and starch No. 4 in conjunction with silica in mechanical furnish, in terms of power spectrum formation index vs. ash content.

Percol 175 and Starch No. 4 in Conjunction with Silica in Mechanical Furnish Microparticulate retention systems employing siliceous material had been found to be very effective in improving retention, drainage and formation. Nevertheless FIG. 13 points out that the application of starch No. 4 in conjunction with colloidal silica (Particol S1020) further improves paper formation in comparison to an adequate dual polymer system employing Percol 175 instead of starch. It should further be noted that the commercial wet-end starch Raisamyl 50021 is not able to provide enough retention in conjunction with Particol S1020 to attain comparable sheet ash levels in this mechanical furnish. From this it follows that the cationic starches of the present invention are capable as retention and drainage aids in mechanical furnishes, and in this regard as single polymer system or in conjunction with microparticulate material.

The invention claimed is:

1. A polysaccharide that has, after a cationisation reaction stage and before any washing stage, a cationic degree of substitution (DS) of 0.60-1.00 and bound nitrogen index (BNI) of at least 0.80.

2. The polysaccharide according to claim 1 wherein the polysaccharide is selected from the group consisting of: starch from potato, tapioca, wheat, corn, waxy-corn or oats, natural galacto-glucomannans of wood material, and guar gum.

3. A papermaking process comprising adding the polysaccharide according to claim 1 to a furnish at any time prior to paper formation.

4. A process for producing the polysaccharide according to claim 1 comprising reacting a polysaccharide with a cationising agent in the presence of a catalyst, wherein in the reaction mixture
   the water/polysaccharide-ratio is 0.60-1.40;
   the molar ratio is over 0.55; and
   the temperature is 5-50° C. at least until 80% of the cationising agent has reacted.

5. The process according to claim 4, wherein in the reaction mixture
   the water/polysaccharide ratio is 0.70-1.20;
   the molar ratio is 0.55-1.50; and
   the temperature is 15-40° C. at least until 85% of the cationising agent has reacted.

6. The process according to claim 4, wherein in the reaction mixture
   the water/polysaccharide ratio is between 0.80-1.10;
   the molar ratio is 0.60-1.20; and
   the temperature is 20-35° C. at least until 90% of the cationising agent has reacted.

7. The process according to claim 4, wherein the catalyst concentration is 0.3-4.0% of dry starch in the reaction mixture.

8. The process according to claim 4, wherein the reaction of the polysaccharide with a cationising agent in the presence of a catalyst takes place in a conical mixer.

* * * * *